(12) United States Patent
Ayoub et al.

(10) Patent No.: US 9,940,123 B1
(45) Date of Patent: Apr. 10, 2018

(54) UPDATING DEVICE CODE THROUGH A BUS

(71) Applicant: Amazon Technologies, Inc., Seattle, WA (US)

(72) Inventors: Hani Ayoub, Majd al-Krum (IL); Nafea Bshara, San Jose, CA (US); Matthew Shawn Wilson, Bainbridge Island, WA (US); Clint Joseph Sbisa, Seattle, WA (US); Barak Wasserstrom, Mitzpe Aviv (IL); Brian William Barrett, Seattle, WA (US); Ronen Shitrit, Kiryat Ata (IL); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/983,459

(22) Filed: Dec. 29, 2015

(51) Int. Cl.
*G06F 9/44* (2006.01)
*G06F 9/445* (2006.01)
*G06F 13/42* (2006.01)

(52) U.S. Cl.
CPC ............ *G06F 8/65* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,698,017 | B1 * | 2/2004 | Adamovits | G06F 8/67 717/168 |
| 2004/0083474 | A1 * | 4/2004 | McKinlay | G06F 8/61 717/176 |
| 2005/0216904 | A1 * | 9/2005 | Needham | G06F 8/67 717/168 |
| 2006/0184929 | A1 * | 8/2006 | Ohtsuka | G06F 8/65 717/168 |
| 2010/0058306 | A1 * | 3/2010 | Liles | G06F 21/572 717/168 |
| 2011/0202691 | A1 * | 8/2011 | Shalgi | G06F 8/67 710/14 |
| 2012/0246442 | A1 * | 9/2012 | Dolgunov | G06F 8/67 711/209 |
| 2013/0086571 | A1 * | 4/2013 | Dasari | G06F 8/665 717/168 |
| 2015/0355900 | A1 * | 12/2015 | Crosby | G06F 3/0679 717/168 |
| 2016/0147527 | A1 * | 5/2016 | Lo | G06F 8/665 717/173 |
| 2016/0266890 | A1 * | 9/2016 | Aleksandrov | H04L 67/34 |
| 2016/0306616 | A1 * | 10/2016 | Tomppo | G06F 8/65 |

* cited by examiner

Primary Examiner — Wynuel Aquino
(74) *Attorney, Agent, or Firm* — Kilpatrick Townsend & Stockton LLP

(57) ABSTRACT

Techniques for updating code of a device may be described. In an example, bus may connect the device to a management entity. The device may run a first version of the code. A second version of the code may be available from memory. The device may access the second version from the memory, stop running the first version of the code, and start running the second version of the code without restarting the management entity or the device.

25 Claims, 14 Drawing Sheets

US 9,940,123 B1

UPDATING DEVICE CODE THROUGH A BUS

BACKGROUND

In many computer systems, peripheral devices are connected to the computing systems using interconnects. The interconnects may implement standard bus protocols, such as any of the Peripheral Component Interconnect (PCI) family of bus protocols. PCI express (PCIe) is an extension to PCI and has been used in most computer applications including enterprise servers, consumer personal computers (PC), communication systems, and industrial applications. PCIe uses a packet-based layered protocol, and is based on point-to-point topology, with separate serial links connecting each endpoint device to a host.

A PCIe device includes firmware (embedded software) configured to provide particular functionalities. Over time, updates to the firmware may be desired. Typically, upgrading the firmware of the PCIe device necessitates resetting the host and the PCIe device. This may cause long down-times and increase power consumptions of the host and the PCIe device.

BRIEF DESCRIPTION OF THE DRAWINGS

Various embodiments in accordance with the present disclosure will be described with reference to the drawings, in which.

DETAILED DESCRIPTION

Figure 1:
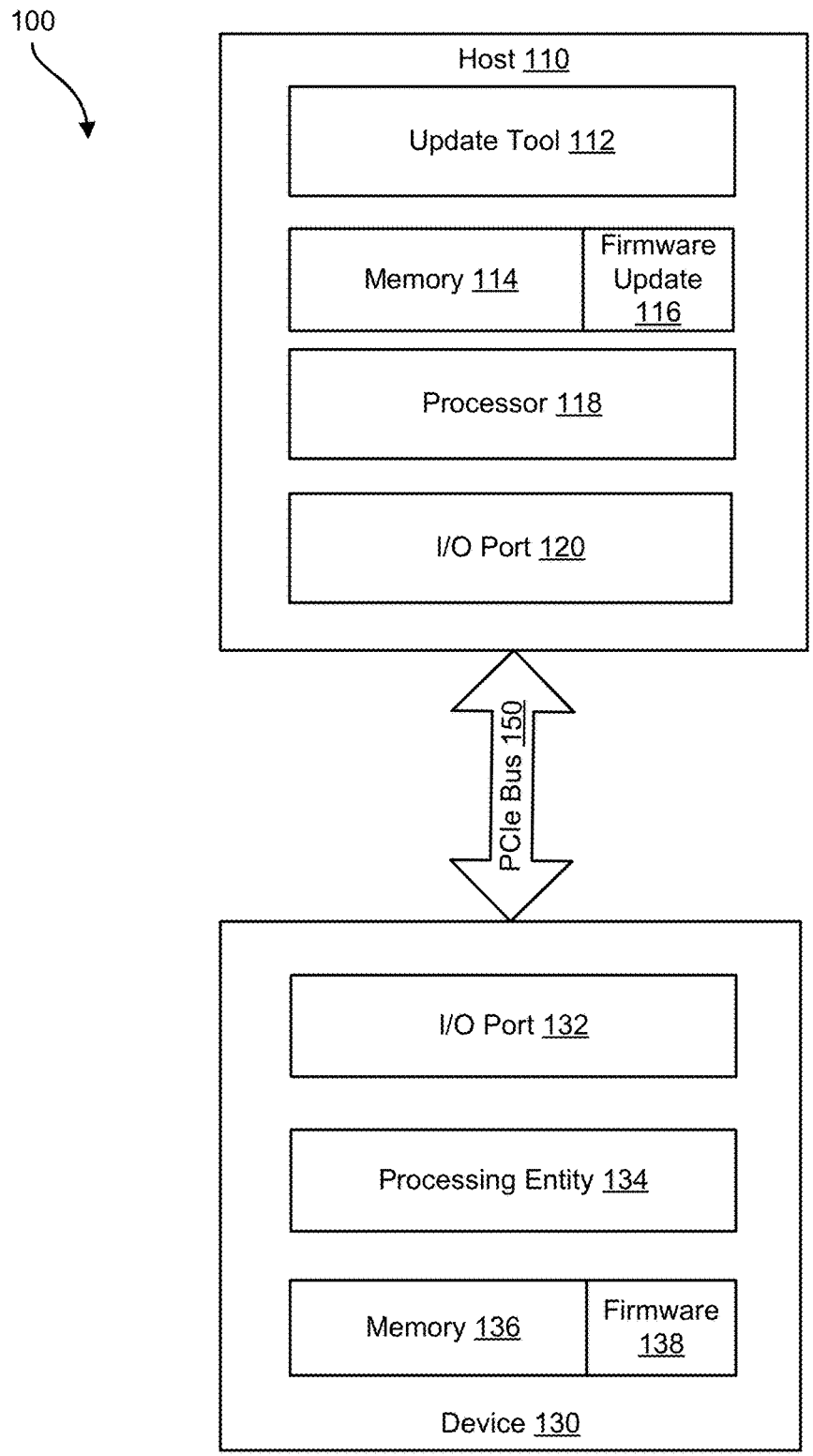
FIG. 1 illustrates an example of a computing system for updating firmware, where the computing system includes a host and a device connected through a bus (e.g., a PCIe bus), according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, updating code of a device. The update may be live and seamless to the device and to other interconnected devices. In an example, a host and a device may communicate via a communication bus, such as a PCIe bus. The device may execute code to perform various operations including ones that may extend functionalities of the host. The code may reside in the device's memory. An updated version of the code may become available. To update the code, the host may copy the updated version to the host's memory and may signal the device that the updated version may be available. In turn, the device may access the updated version and switch to executing the updated version. For a live and seamless update, a block of the device's memory may be reserved and may be accessible to the host based on the capabilities of the communication bus (e.g., the PCIe capabilities). Upon a successful host-device handshake, the host may copy the updated version into the reserved memory block. The device may access the updated version from the reserved memory block and, in an example, copy the updated version to a buffer of the device's memory. The copying may involve copying portions of the code such that, upon copying a portion, other transactions of the host and/or device may be performed prior to copying a next portion. Once the updated version is copied, the device may perform a context-switch to the updated version taking into account which contexts may be updatable or not.

To illustrate, consider an example of a PCIe device and a host communicating over a PCIe bus. Firmware may be stored in the PCIe device's memory. The host may receive an upgraded version of the firmware for pushing to the PCIe device. For a live and seamless upgrade (e.g., one that may not necessitate a host and/or a device restart or reset), a block of the host's memory may be mapped to a block of the PCIe device's memory. The two blocks may be reserved for firmware updates. Each of the blocks may contain a buffer for storing the upgraded version and a register for controlling the upgrade. As such, the host may copy the upgraded version to the buffer of the host's memory and update the register with information about the upgraded version (e.g., size, checksum) and about the upgrade itself (e.g., a Boolean value indicating that the upgrade should be performed, and a secret shared between the host and the PCIe device for added security). The upgraded version and the register information may become available to the PCIe device from the reserved block of the PCIe device's memory. The host may send a particular transaction request or a network packet to the PCIe device to trigger access to the upgraded version. For example, the transaction request may result in an interrupt handler. In response, the PCIe device may access the PCIe device's memory block, check the register information, and determine that the upgrade should be performed. The PCIe device may accordingly copy, in chunks, the upgraded version to another buffer of the PCIe device's memory block while also handling interrupts in between the copying of chunks. This approach may facilitate a live upgrade. Once copied, the PCIe device may switch to executing the upgraded version from the corresponding buffer. The switching may use the last running state of the firmware before the upgrade. From that point on, the running state may be updated based on the execution of the upgraded version. This approach may facilitate a seamless upgrade.

In the interest of clarity of explanation, the embodiments of the present disclosure may be described in connection with examples about firmware updates and a host and a device interconnected through a PCIe bus. An update may include an upgrade, a downgrade, or other types of changes to the firmware. The embodiments may also similarly apply to any code, whether firmware code or other software code, such as state machine sequences, configuration of code variable, field-programmable gate array (FPGA) code, and system-on-chip (SoC) code. Further, the embodiments may similarly apply to a management entity (e.g., a host) and a device connected via other types of communication bus.

Turning to FIG. 1, the figure illustrates an example of a computing system 100 for updating firmware. The computing system 100 may include a host 110 and a device 130 connected through a PCIe bus 150. Although the bus 150 is depicted as a PCIe bus, any of the embodiments disclosed herein can also be implemented using other types of buses that use various protocols. The device may store firmware 138 in the device's memory 136. A firmware update 116 may be available and may be pushed to the device 130. The updated version of the firmware 138 may use different memory blocks, registers, and buffers than the current version of the firmware 138 such that the update may be live and seamless.

In an example, the host 110 may represent a computing resource, such as a management entity, configured to provide various functionalities of the computing system 100. For example, the host 110 may include an enterprise server, a computer personal computer, a communication system, or another type of computing resource. In comparison, the device 130 may represent a peripheral device, such as a PCIe device, an FPGA device, or an SoC device. In particular, the device 130 may be a peripheral device that may add or change the functionalities of the host 110 and, thus, the computing system 100. For example, the device 130 may include a storage device, an input/output device (e.g., a display, speaker, etc.), a network interface card, a wireless and/or wired network card, and other peripheral devices. The PCIe bus 150 may represent a communication bus implementing PCIe.

In a further example, any of the host 110, the device 130, and the PCIe bus 150 may be virtualized. For instance, the host 110 may include a virtual instance of a server hosted in a datacenter. The device 130 may include a peripheral device with Single Root Input/Output Virtualization (SR-IOV) capabilities. SR-IOV is an extended capability that allows a physical resource (e.g., a single network interface controller) to appear as multiple resources (e.g., sixty-four network interface controllers). Thus, a SR-IOV peripheral device providing a certain functionality may appear to be multiple devices providing that functionality.

Turning to the details of the host 110, the host 110 may include a memory 114, a processor 118, and an I/O port 120. The memory 114 may include an operating system and various applications. An application may represent a set of instructions that, when executed, with the processor 118 may provide various operations. An example of such applications may include the update tool 112. In particular, the update tool 112 may be provided in a user space and may be configured to receive, generate, compile, and/or store the firmware update 116 in the memory 114. The I/O port 120 may be configured to facilitate I/O operations between the host 110 and the device 130 over the PCIe bus 150. Although FIG. 1 illustrates the firmware update 116 as being stored in the memory 114 of the host 110, the embodiments of the present disclosure are not limited as such. Instead, the firmware update 116 may be available from any storage at a network location accessible to the host 110 and/or device 130 over a network and/or the bus 150.

The device 130 may similarly include an I/O port 132. In addition, the device 130 may include a processing entity 134 and a memory 136. The processing entity 134 may represent any module, whether implemented in hardware and/or software, configured to provide processing functionalities. For example, the processing entity 134 may be a physical processor or a virtualized processor. The memory 136 may store the firmware 138. The firmware may represent embedded software code that may be used by the device 130 to provide peripheral functionalities. In this case, the processing entity 134 may be a special purpose processor designed for these functionalities.

The PCIe bus 150 may facilitate communications between the host 110 and the device 130 such that the device 130 may provide the peripheral functionalities to the host 110. In addition, based on various PCIe capabilities, the firmware update 116 may be provided (e.g., sent or pushed) from the host 110 to the device such that the device may update or replace the firmware 138 with the firmware update 116. In an example, the firmware update 116 may be a binary that may include an upgraded version of the firmware 138 to fix bugs thereof. The PCIe capabilities may include mapping and addressing of different memory blocks between the memory 114 of the host 110 (e.g., the host memory) and the memory 136 of the device 130 (e.g., the device memory). In particular, the PCIe capabilities may support reserving memory blocks for the host 110 and the device 130 to update firmware. In turn, the host 110 may use a reserved memory block to pass the firmware update 116 to the device. The device 130 may accordingly update the firmware 138 with the firmware update 116. The initial handshake to set-up the memory blocks and the switch to the firmware update 116 may allow a live and seamless update of the firmware 138, thereby avoiding a restart or reset of the host 110 or the device 130. These and other features are further described in the next figures.

Figure 2:
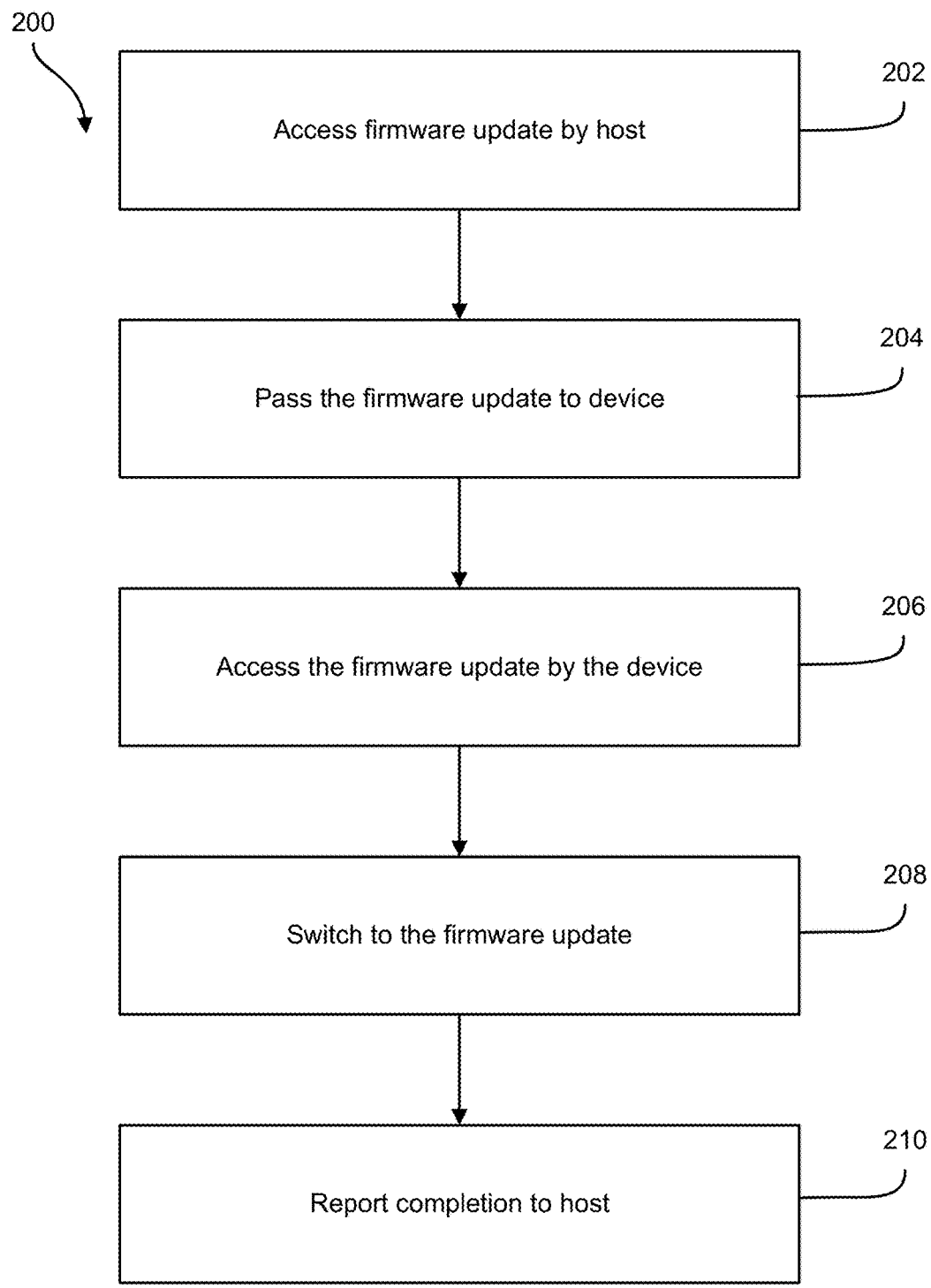
FIG. 2 illustrates an example flow for updating firmware, according to embodiments of the present disclosure.

FIG. 2 illustrates an example flow 200 for using the computer system 100 to update the firmware 138. In the illustrative operations, some of the operations or functions may be embodied in, and fully or partially automated by, modules executed by one or more processors. In addition, while the operations are illustrated in a particular order, it should be understood that no particular order is necessary and that one or more operations may be omitted, skipped, and/or reordered.

The example flow 200 may start at operation 202, where the firmware update 116 may be accessed by the host 110. For example, the update tool 112 may receive the firmware update 116 from a source external to the host 110, such as from another computing resource of the computing system 100 or of another computing system. In another example, the update tool 112 may generate the firmware update 116 in response to user input.

At operation 204, the firmware update 116 may be passed to the device 130. For instance, the update tool 112 may store the firmware update 116, information about the firmware update 116, and information about the update itself in a block of the memory 114. In a particular example, the block may be a reserved block and may be mapped to a corresponding reserved block of the memory 136 of the device 130 based on the PCIe capabilities. An example of this mapping is further illustrated in FIG. 5. The host 110 may send a particular transactions to trigger the device's 130 upgrade initialization. In response, the device 130 may access the reserved block of the memory 136, and determine that the firmware update 116 may be available. The device 130 may then signal to the host 110 that the device 130 may have entered an updating state in which the device 130 may update its firmware 138.

At operation 206, the device 130 may access the firmware update 116. In an example, the device may access the firmware update 116 from the reserved block of the memory 136 of the device 130. In a further example, the firmware 138 of the device 130 may copy the firmware update 116 to a buffer of the memory 136. The copying may be performed in chunks such that between the copying of chunks, the device 130 may respond to interrupts. These interrupts may originate from the host 110, other components of the device 130, or from other computing resources internal or external to the computing system 100 (e.g., from a client connected to the host 110). An interrupt may represent an example of a higher and independent privilege mode in the processor of the device 130. Other privilege modes of the processor may be similarly used to perform the copying.

At operation 208, the device 130 may switch from using the firmware 138 to the firmware update 116. In an example, the firmware 138 may access a predefined location of the memory 136 storing the firmware update 116. The predefined location may correspond to a set-up routine. The set-up routine may allow a context switch between the firmware 138 and the firmware update 116 such that the firmware update 116 may use the last running state of the firmware 138. Upon running the set-up routine, the switch to the firmware update 116 may be complete.

At operation 208 the device 130 may report the completion of the update to the host 110. For example, the device may signal to the host 110 that the device 130 may have entered a state corresponding to the completion.

Although FIGS. 1 and 2 illustrate a host 110 updating a device's 130 firmware, other computing resources may be involved. For example, a computing resource remote from the host 110 and/or device 130 may trigger the update. The device 130 may communicate with such a computing resource directly or via the host 110 to perform the update and report the update status.

Figure 3:
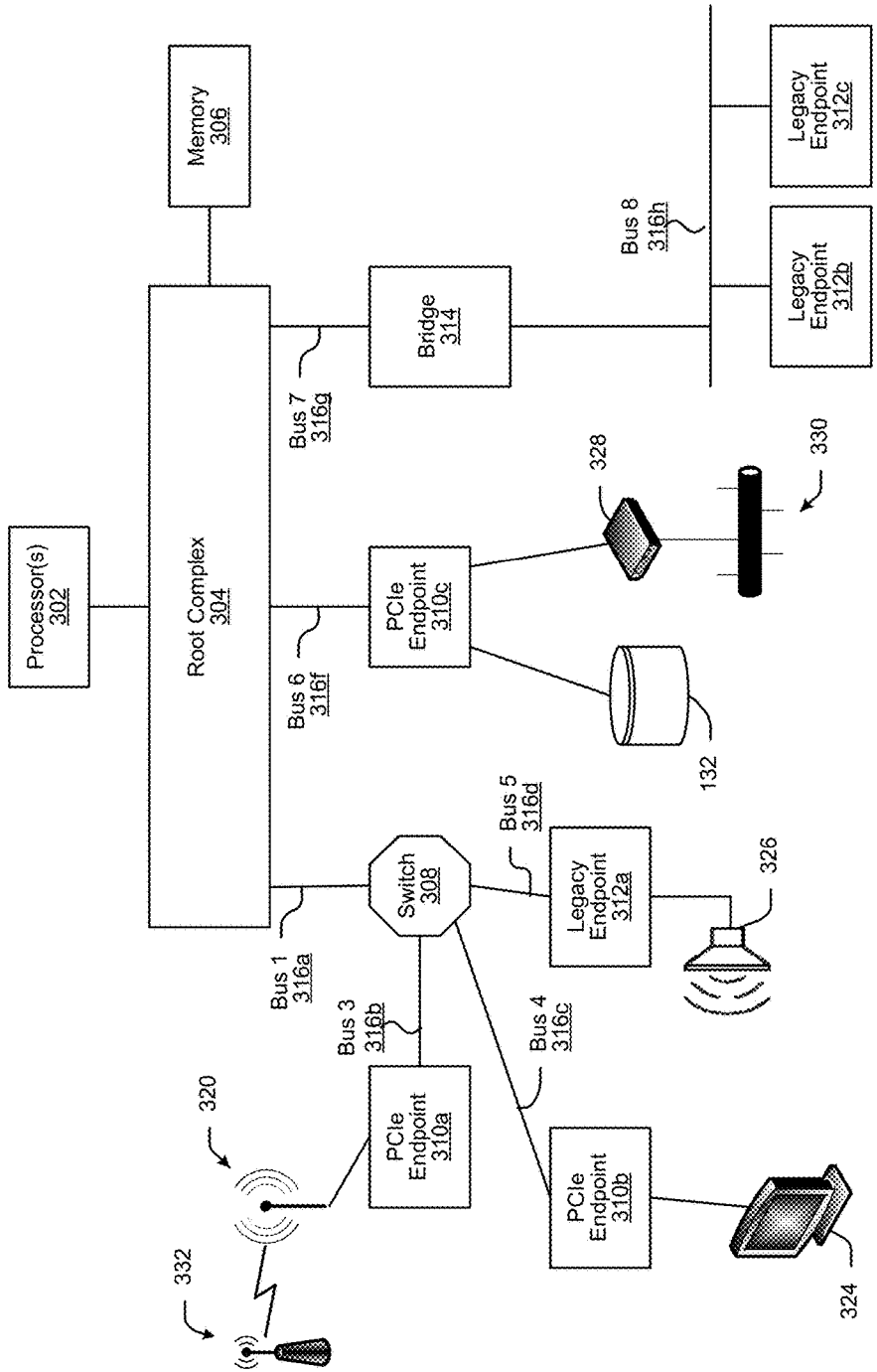
FIG. 3 illustrates an example of a computing system that includes multiple peripheral devices connected to the computing system through PCIe buses, according to embodiments of the present disclosure.

Although FIGS. 1 and 2 illustrate a single host 110 and a single device 130, the computing system 100 may include a larger number of hosts (or any other types of a management entity) and/or devices. Thus, the firmware update may not be limited to one host or one device. FIG. 3 illustrates a further example of such a computing system. In particular, FIG. 3 illustrates an example of a computing system 300 that may include multiple peripheral devices interconnected through PCIe buses. The peripheral devices may include hardware devices and/or devices that include a combination of hardware and software that may be attached to the computing system 300 to add functionality to the computing system 300. Examples of peripheral devices may include storage devices, displays, speakers, wired and/or wireless network adapters, adapters to provide additional ports, bridges, hubs, switches that provide ports for additional peripheral devices, and others. Generally, the peripheral devices may be connected and disconnected from the computing system 300 to change the functionality of the computing system 300.

The computing system 300 may include peripheral devices that implement one or more variations of PCI standard bus protocols, or other bus protocols. A bus may be a communication channel that may transfer data within a computing system, or between a computing system and other devices. A standardized bus protocol may be a data transfer protocol for which a specification has been defined and adopted by various manufacturers. Manufacturers may ensure that compliant devices are compatible with computing systems implementing the bus protocol, and vice versa. PCI describes a family of related, standardized bus protocols. As used herein, "PCI" includes the original PCI standard, PCI-eXtended (PCI-X), Accelerated Graphics Port (AGP), and PCI Express (PCIe, also referred to as PCI-XP). As used herein, the term "PCI" may be used to describe any protocol in the PCI family of bus protocols.

As shown in FIG. 3, the computing system 300 may include one or more processors 302, a root complex 304, a memory subsystem 306, a switch 308, a bridge 314, and a number of peripheral devices (or PCIe endpoint devices). Root complex 304 may be referred to as a host bridge. The root complex 304 and its associated processors and memory may be referred to as a host. PCIe switches, bridges and endpoint devices may be referred to as PCIe devices. In this example, the peripheral devices may include PCIe endpoints 310a-c and legacy endpoints 312a-c. The processors 302 may be any general purpose computing devices capable of executing software code. The processor 302 may include multiple processing cores.

Typically, there may be a single root complex in a PCIe system. A root complex may include one or more root ports, one or more CPUs, and their associated RAM and memory controller, as well as other interconnect and/or bridging functions. The root complex may be similar to a northbridge in a PCI-based system. The root complex may act as a "glue" logic to connect PCIe devices to main memory (RAM), and the CPU. In many cases, the root complex also may provide high speed PCIe connection to a graphics processor unit (GPU). The root complex may be implemented as a part of the north-bridge in systems that employ two physical chips for chipset logic. In many embodiments, the root complex may be integrated into a central processing unit (CPU) chip. The root complex may be connected to PCIe devices through root ports. In some embodiments, the root complex and the root ports may be implemented in a single chip. In some other embodiments, the root ports and the root complex may be implemented in different chips. For example, the root complex may reside in a CPU, while the root ports may be located in a chipset.

The root complex 304 in FIG. 3 may be a hardware device or a hardware and software device that may connect the processors 302 and the memory subsystem 306 to the peripheral devices. PCIe devices may be connected directly to the root complex 304. For example, the PCIe endpoint 310c is connected directly to the root complex 304. Alternatively or additionally, the PCIe devices may be connected to the root complex 304 through the switch 308. The bridge 314 may also be connected to the root complex 304. The root complex 304 may forward transactions to the processors 302 and direct responses from the processors 302 back to the PCIe devices. The root complex 304 may further generate transactions on behalf of the processors 302, and forward responses to those transactions back to the processors 302.

In some cases, the root complex 304 may also route transactions from one PCIe device to another, and/or between PCIe devices, switches, and bridges. The root complex 304 may provide services for the computer system 300, such as a hot plug controller, a power management controller, an interrupt controller, and/or error detection and reporting. In some implementations, the root complex 304 may be implemented as part of a host system that includes one or more integrated processors and memory.

The memory subsystem 306 provides temporary or long-term storage for data that may be used by the computing system 300. The memory subsystem 306 may include Dynamic Random Access Memory (DRAM), Synchronous DRAM (SDRAM), and/or Double Data Rate (DDR), among others. In some cases, memory subsystem 306 may also include Read Only Memory (ROM), such as Programmable Read Only Memory (PROM), Erasable Programmable Read Only Memory (EPROM), Electrically Erasable Programmable Read Only Memory (EEPROM), and/or Flash EEPROM, among others. In some implementations, the root complex 304 may include a memory controller to manage transactions to and from the memory subsystem 306. In other implementations, the processors 302 may include a memory controller. Alternatively or additionally, the computing system 300 may include an external memory controller in communication with either the processors 302, the root complex 304, or both the processors 302 and the root complex 304, and the memory subsystem 306.

Peripheral devices may be devices configured to generate and/or respond to data transactions. For example, peripheral devices may be "requesters" (transaction generators) and/or "completers" (transaction responders). In PCI implementations, peripheral devices may include PCIe endpoints, such as peripheral devices that may be configured to communicate using the PCIe protocol. A PCIe endpoint device may be a PCIe device that may terminate a PCIe link. The PCIe endpoint device may only have one connection to the PCIe system topology, but may have a connection to another kind of bus. For example, a PCIe network card in most cases may be an endpoint device, just as PCIe storage controller, etc. A PCIe endpoint device may also act as a bridge to legacy/compatibility bus, such as a PCIe-to-PCI bridge, or a bridge to a low pin count (LPC) bus, etc.

A PCIe switch may be a device configured to connect two or more PCIe links. A PCIe switch may include several virtual PCI-to-PCI bridges internally, and behave as multiple PCI-PCI bridges, decoupling upstream and downstream ports so that each link may work as a point-to-point connection. The switch 308 in FIG. 3 may function as a multi-port connecter between various devices, including the root complex 304, peripheral devices, and possibly other switches and bridges. The switch 308 may route transactions between any of the devices connected to it. For example, the switch 308 may route transactions between the PCIe endpoints 310a-b and the legacy endpoint 312a, and between the various endpoints 310a-b, 312a and the root complex 304. The switch 308 may also provide arbitration to prioritize incoming and outgoing transactions. Devices connected to the switch 308 may treat the switch 308 as another requester and/or completer. Though not illustrated here, switches can also be connected to other switches to further expand the number of peripheral devices that can be connected to the computing system 300.

The bridge 314 may provide connectivity to other buses or switching fabrics. The other buses or switching fabrics may implement a PCI variant or another protocol. For example, in the example of FIG. 3, the bridge 314 provides connectivity to a bus implementing the original PCI standard. The bridge 314 may include mechanisms to translate from one bus protocol, such as the original PCI standard, to another protocol, such as PCIe.

Components in the computing system 300 may be connected through a shared bus. For example, in the illustrated example, the legacy endpoints 312b-c may be connected to a shared PCI bus 316h. Alternatively or additionally, peripheral devices may be connected to the computing system 300 in a switching fabric topology. The interconnected devices illustrated in FIG. 3, including the root complex 304, the switch 308, the bridge 314, and the PCIe endpoints 310c, may form an example of a switching fabric. A switching fabric topology may include point-to-point connections between the devices connected to the fabric, and may include a routing system for passing messages between the devices. In a switching fabric, transactions may be spread across multiple physical links. In the example in FIG. 3, the switch 308 may be connected to the root complex 304 through a bus 316a and the PCIe endpoint 310c may connected to root complex 304 through a bus 316f. Similarly, the bridge 314 may be connected to the root complex 304 through a bus 316g. Each of the PCIe endpoints 310a-b and the legacy endpoint 312a are also connected to the switch 308 through individual buses 316b-d. The connections between each of the root complex 304, the switch 308, the bridge 314, the PCIe endpoints 310a-c, and the legacy endpoint 312a may be point-to-point connections because each of the buses 316a-g may not be shared with another device. Furthermore, a packet directed from one device to another (for example, from the root complex 304 to the PCIe endpoint 310a) may be routed directly to its destination.

In some embodiments, the connections between the devices in the computing system 300 may be numbered. For example, in the illustrated example, the connection between the switch 308 and the root complex 304 may be labeled bus "2" (bus "0" may be internal to the root complex 304). Similarly, each of the buses connecting the PCIe endpoints 310a-b and the legacy endpoint 312a to the switch 308 may be labeled bus "3"-"5," respectively (bus "2" may be internal to the switch 308). Furthermore, the connection between the root complex 304 and the PCIe endpoint 310c may be labeled bus "6," while the connection between the root complex 304 and the bridge 314 may be labeled bus "7." Finally, the shared bus downstream from the bridge 314 may be labeled bus "8." In most cases the numbers of the buses are arbitrary, though bus numbers may generally be assigned in a logical fashion. For example, bus "0" may be located within root the complex 304, and the bus label may increment as the distance between the bus and the root complex 304 increases.

As noted above, peripheral devices may add to and/or modify the functionality of computing the system 300. For example, one PCIe endpoint 310a may implement a Wi-Fi adapter 320. Using the Wi-Fi adapter 320, the computing system 300 may be able to communicate wirelessly with a wireless access point 322, to access a network. As another example, the PCIe endpoint 310b may implement a video card. A video card may include a port to connect a monitor 324 or other display devices. As a further example, the computing system 300 may include a legacy endpoint 312a that may implement a sound card. A sound card may include a port or jack that may accept a plug for a speaker 326 or other audio output devices.

The hardware and/or software components in a peripheral device that provide the functionality of, for example, a network interface or a storage controller may be called a "function." Types of functions that may be provided by a peripheral device may include, for example, mass storage controllers, network controllers, display controllers, multimedia devices, memory controllers, bridges, input devices docking stations, serial bus controllers, wireless controllers, satellite communications controllers, and encryption/decryption controllers, among others.

In some cases, a PCIe endpoint may be a multi-function device, such as a device that may provide the functionality of multiple devices. For example, the PCIe endpoint 310c may include an Ethernet adapter, and provide a connection to a gateway device 328, such as a DSL or cable modem. The PCIe endpoint 310c may also include a storage adapter and provide a connection to a storage device 332. The PCIe endpoint 310c thus may provide access to both a network 330 and storage device 332.

Figure 4:
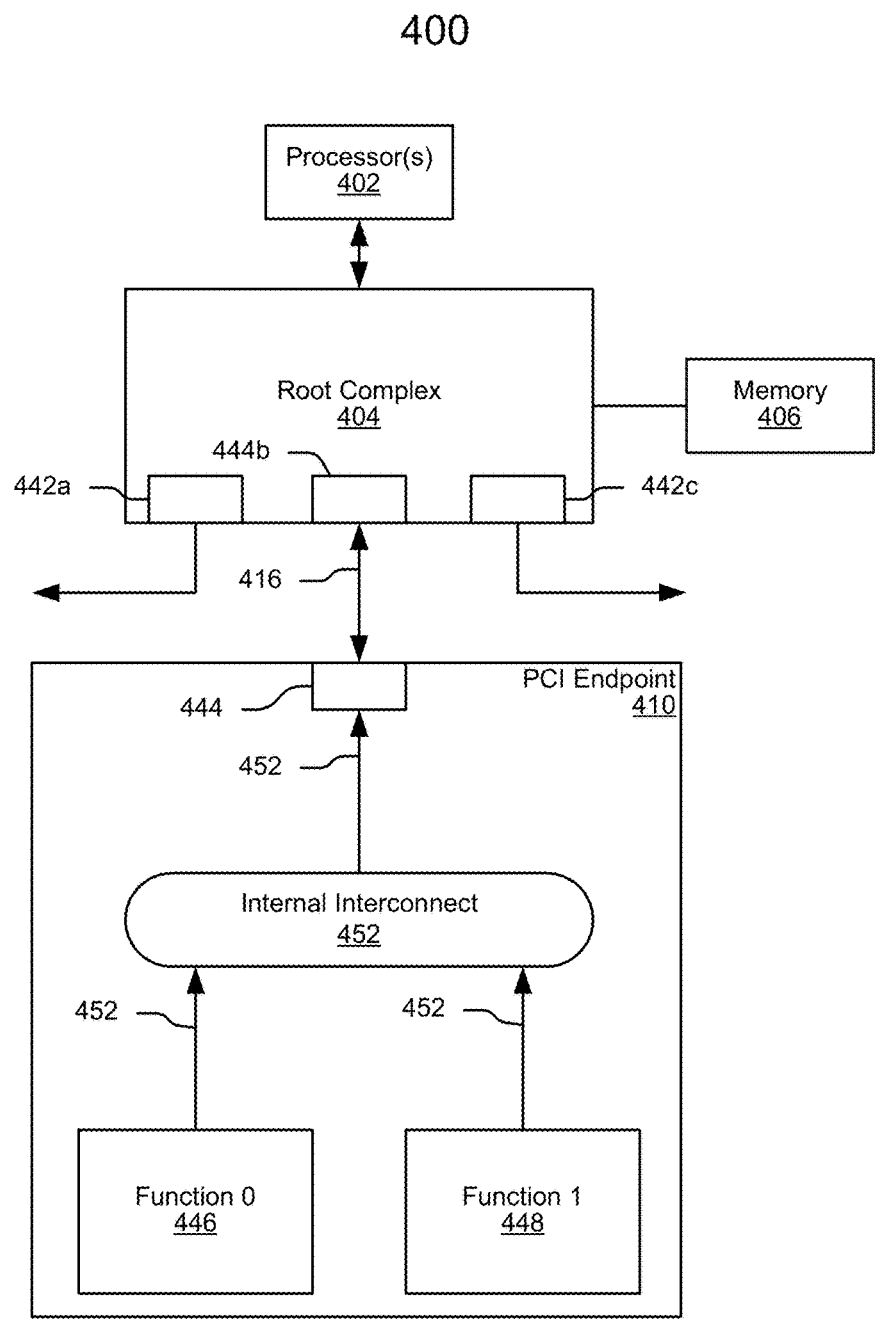
FIG. 4 illustrates an example of a computing system including at least one PCI endpoint, according to embodiments of the present disclosure.

FIG. 4 illustrates an example of a computing system 400 including at least one PCI endpoint 410 and the internal components and operation thereof. In this example, the PCI endpoint 410 may be in communication with a root complex 404 over a PCI interconnect 416. The root complex 404 may be in communication with one or more processors 402 and a memory subsystem 406. The root complex 404 may include one or more ports 442a-c. The ports 442a-c may be connected, using additional PCI interconnects, to PCI switches, bridges, and endpoints, including the illustrated PCI endpoint 410. The root complex 404 may route transactions between the processors 402 and any of the endpoints, switches, or bridges, or between the endpoints, switches, and bridges themselves. PCI is used as an illustrative example of a bus protocol that may be implemented by a computing system to connect to peripheral devices. It is understood that the example illustrated in FIG. 4 may apply to other bus protocols that may be used to connect peripheral devices to a computing system.

The PCI endpoint 410 in this example may include a port 444, two functions 446, 448, and an internal interconnect 452 that may connect the functions 446, 448 to the port 444. The port 444 may include a physical interface for connecting to a cable, socket, port, or other connection to PCI interconnect 416. The port 444 may further include hardware and/or software to manage incoming and outgoing transactions. The port 444 may translate an internal transaction from the functions 446, 448 into a PCI transaction for transmission over the PCI interconnect 416. The port 444 may further translate transactions received over the PCI interconnect 416 for transferring over the internal interconnect 452 to the functions 446 and 448.

In a PCIe system, data may be routed based on memory address or identifier (ID), depending on transaction types. Within the PCIe system, some or all of the devices may share a same system memory space, and each may be assigned a block or region in the system memory space. The block or region for each PCIe device may be identified by base address register(s) (BAR) of each device in the device's configuration space register header. Therefore, a PCIe device may typically be uniquely identified and configured within the PCIe system. This may be done by an enumeration process.

During system initialization, the root complex of the PCIe system may perform the enumeration process to determine various buses that may exist and various PCIe devices that may reside on each bus, as well as an address space for each PCIe device. The root complex may allocate bus numbers to PCIe buses and may configure the bus numbers to be used by PCIe switches. The enumeration process may reserve bus numbers and address space for empty slots. All PCIe switches and endpoints within the system domain may be detected at the end of the enumeration process.

For example, when a computing system such as the computing system 300 in FIG. 3 (and similarly, the computing system 100 of FIG. 1) initially powers up, the processors 302 may be unaware of any peripheral devices that are connected to the system. The processors 302 may be aware of the root complex 304, and possibly also that the root complex 304 may be connected to one or more buses. To learn about the rest of the PCIe system, the processors 302 may execute a process to scan and configure the system. This process may be referred to as an enumeration process. The specific process of scanning for, locating, and identifying peripheral devices may be called discovery or discovering. During an enumeration process, software executing on the processors 302 may first scan each of the buses 316a, 316f, 316g connected to the root complex 304, and identify the switch 308, the PCIe endpoint 310c, and the bridge 314. Upon discovering the switch 308, the processors 302 may next scan the buses 316b-d connected to the switch 308. The processors 302 may thereby discover the PCIe endpoints 310a-c and the legacy endpoint 312a. Upon discovering the bridge 314, the processors 302 may also scan the bus 316h; however, the bridge 314 may translate the scanning instructions to the protocol implemented by the bus 316h.

The root complex 304 may also be in charge of setting base address registers (BARs) of each device during initialization or enumeration. A PCIe system typically includes a memory address space and an I/O address space. The memory address space and the I/O address space of the host may be subdivided into multiple address space blocks. Each of the address space blocks may be assigned to a PCIe device and mapped to a block in the device's address space. These address space blocks may each be assigned a base address, where the base address may specify the region of the host address space that may assigned to a device.

During or after the enumeration process, the root complex processor may assign memory address space to each PCIe device in the system domain. In some implementations, the memory address space assigned to a device may be stored in a configuration space register in the device. Software executing on the processors 302 may be responsible for managing all available memory, and, for example, ensuring that no two devices are assigned overlapping memory regions. Alternatively or additionally, memory may be managed by a memory controller. The absolute memory address range in the system memory allocated to a PCIe device may be based on which slot the PCIe device is plugged into. A PCIe device may be assigned a default size, such as 36 MBs of memory space. If a PCIe device requests more memory space, the memory assignment may be adjusted accordingly. The corresponding memory space is assigned to an endpoint by writing the address of the assigned memory space to its BAR.

While or possibly after scanning the buses, the processors 302 may also transmit configuration transactions to each of the devices it may discover. The configuration may include, for example, assigning the memory address space and the I/O address space. The configuration may further include programming information, such as a bus number and/or a device number, into configuration registers in the devices. During the configuration, the processors 302 may also read information from configuration registers in the device. In most implementations, the configuration registers may be included in the hardware of a device.

In some embodiments, the switch 308 and the bridge 314 may also include a configuration space with configuration registers. In such embodiments, the processors 302 may read configuration registers in the switch 308 and the bridge 314. The switch 308 and the bridge 314 may also be configured by the processors 302, for example, with bus and device numbers, and base address registers.

In a PCIe system, address routing is used to transfer data to or from memory, memory mapped I/O, or I/O locations between devices. There may be two address domains in a PCIe system. A system domain may be the global address domain as seen by the root complex. A local domain may be the address as seen by a local endpoint device. These two domains may be independent of each other. The root complex may be free to assign address space in the system domain and the local endpoint device may freely assign address space in its local domain. In order to bridge address space between the system domain and the local domain, the endpoint device may support address translation between the two domains.

In a PCIe system, a root complex may be responsible for the allocation of memory addresses for the system domain. An endpoint may be responsible for the allocation of memory addresses for its local domain. In the system domain, the root complex may reserve a block of memory address space for all endpoint devices. This reserved block of memory may be divided into smaller blocks. Each smaller block may be reserved for one endpoint device that may connect to the host.

Whenever the root complex detects an endpoint in a particular slot (or port of the PCIe switch) during system initialization, the root complex may assign an address space to the endpoint. The starting address, size of the address block that may be reserved per slot, and the number of PCIe ports in the system may be adjusted based on system architecture. The starting address for a range of addresses assigned to a device may be written in a base address register in the device's configuration space register header.

An endpoint may be responsible for the address map of its local domain. This may be independent of the memory map of the system domain. An address translation unit may reside in the endpoint to translate address space between the system domain and the local domain.

BARs are parts of PCIe configuration register and may be implemented on all PCIe devices which require system memory, I/O, or memory mapped I/O (MMIO) addresses allocated to them. A PCIe device may typically implement the PCIe configuration register according to the PCIe specification. Otherwise, the device may not be regarded as a valid PCIe device. A BAR may be used for allocating one block of prefetchable or non-prefetchable memory, or a block of I/O addresses in the system memory or I/O map for a device. Prefetchable may mean that the contents of the memory addressed by the BAR may be fetched before a request to that specific memory address is made. This feature may be used to improve the overall PCI device memory read speed.

The PCIe configuration register may control the behavior of the PCIe device at all times. Changing a value in the PCIe configuration register may change the behavior of the system. The PCIe configuration register may consist of 456 bytes of registers, from (byte) offset 00h to (byte) offset FFh. The 456-byte PCIe configuration register may include two parts, the first 64 bytes may be called PCIe configuration register header and the rest bytes may be called device-specific PCIe configuration register. BARs maybe generally located in the PCIe configuration register header. BARs may affect the mapping between a PCIe device memory and a system memory.

As described above, there may be two address domains in a PCIe system: the system domain as seen by the root complex, and the local domain as seen by a local endpoint. To avoid a memory address conflicts, a typical implementation may use address translation between the system and local domains.

An endpoint may support both inbound and outbound address translation. Transactions initiated on the system domain and targeted on an endpoint's local domain may be referred to as inbound transactions. Transactions initiated on an endpoint's local domain and targeted at the system domain may be referred to as outbound transactions. During inbound transactions, an inbound Address Translation Unit (ATU) may convert a system domain address to a local domain address of an endpoint. During outbound transactions, an outbound ATU may convert an endpoint's local domain address to a system domain address and may initiate the data transfer on the system domain. When the endpoint accesses any local address space that may fall within a window, the address translation unit may forward the request to the system domain. The local address may be also translated into the system domain address space.

An inbound ATU in an endpoint may allow initiators in the system domain to directly access the local memory domain within an address range. The endpoint may set up the inbound and outbound ATUs to translate addresses between its local domain and the system domain. When the endpoint receives a memory request from the system domain, it may receive the packet only if the address in the packet header may be within the memory range assigned to the endpoint in the system domain. If the requested address is within a system address window, the request packet may be forwarded from the system domain to the local domain. The address field in the request packet may also be translated to an inbound local address. The inbound local address may represent a local buffer in memory that the endpoint may read or write in response to the request from the system domain, or it may represent a local register that may affect the endpoint directly.

When an endpoint needs to access any address space in the system domain, it may access an address within an outbound address window specified by the BAR register of the endpoint. When the endpoint detects that the requested address may fall within the outbound address window, it may forward the request to the system domain and the address in the request may also be translated from the local domain to the system domain address space.

Figure 5:
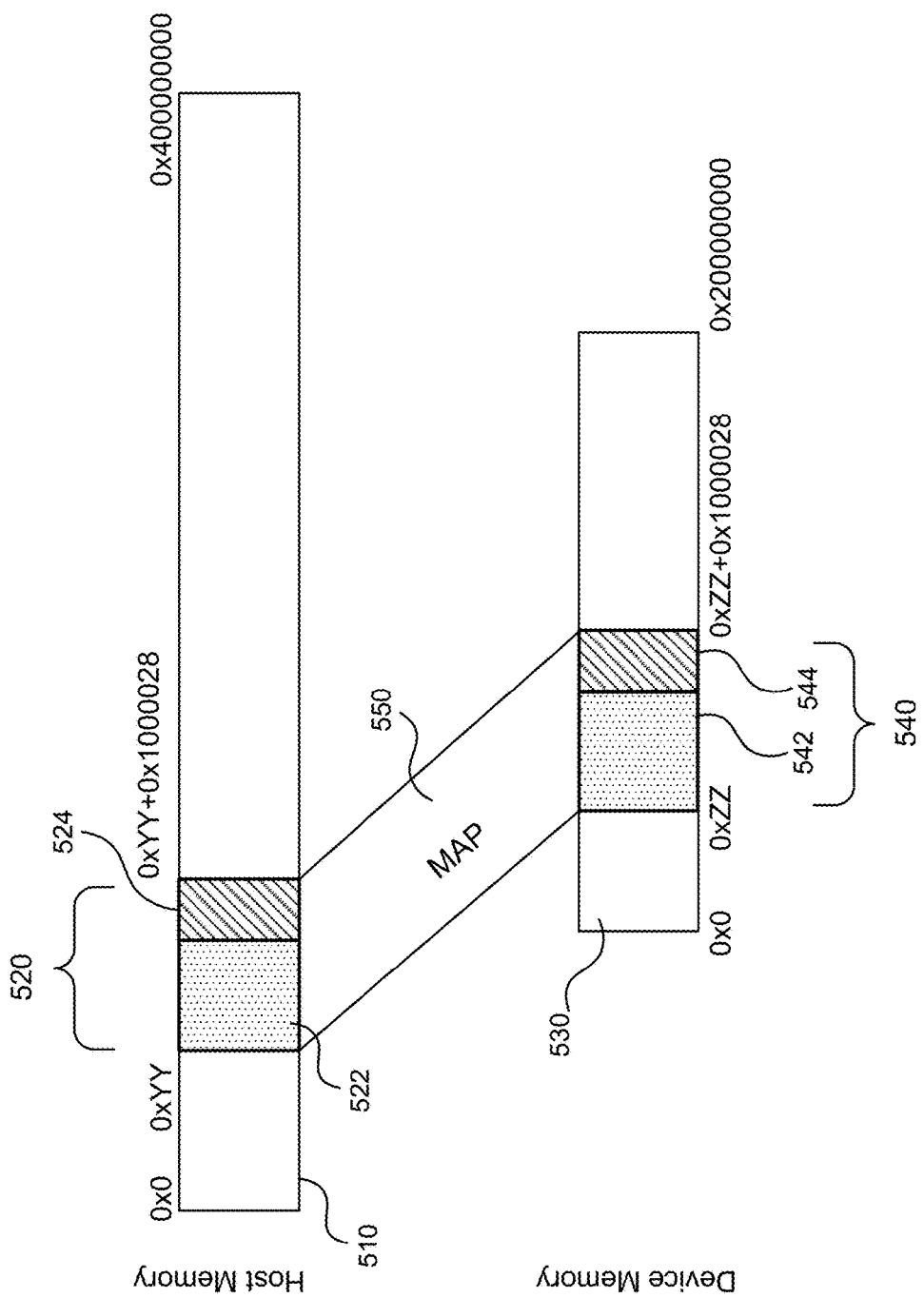
FIG. 5 illustrates an example of memory mapping and accessing between a PCIe host and a PCIe device, according to embodiments of the present disclosure.

FIG. 5 illustrates an example of memory mapping and accessing between a host and a device based on PCIe capabilities. The memory mapping and accessing may facilitate an update of the device's firmware. As shown in FIG. 5, a host memory 510 may include a memory space of, for example, 16 GB from address 0x0 to 0x40000000. In comparison, a device memory 530 may include a memory space of, for example, 8 GB from address 0x0 to 0x20000000. During system initialization or enumeration, a memory block 520 in the host memory 510 and a corresponding memory block 540 in the device memory 530 may be reserved and mapped to each other (shown as a map 550 in FIG. 5). The memory blocks 520 and 540 may be used for updating the device's firmware. The memory block 520 may start at host memory address 0xYY and end at host memory address 0xYY+0x100028. The starting address of the host memory address 0xYY of the memory block 520 may be saved in a BAR register in the device's configuration space register. Similarly, the memory block 540 may start at device memory address 0xZZ and end at device memory address 0xZZ+0x100028. The starting address of the memory block 540 may be saved in another BAR register of the device's configuration space register. These bar registers may be part of the map 550.

When changes are made to the memory block 520 of the host, the changes may be reflected in the memory block 540 of the device based on the BAR and address translation. When the host needs to read data from the memory block 540 in the device memory 530, the host may send a request with the host memory address to the device. The device may check the host memory address in the request packet header against the address of the reserved memory block 520 specified by the BAR. If the request address falls within the reserved memory block 520, the device may translate the host memory address to the device memory address using an internal ATU and send the data at the device memory address in the device memory to the host in packets. When the host needs to write data into the memory block 540 of the device, the host may send the data with host memory address to the device in packets. The device may check the host memory address against the address of the reserved memory block 520 specified by the BAR. If the host memory address falls within the reserved memory block 520, the device may translate the host memory address to the device memory address using the internal ATU and write the data to the device memory at the device memory address. In this way, the host may read from and/or write to the memory block 520 in the host memory 510 as if the host were reading from or writing to the memory block 540 in the device memory 530.

The device may access the memory block 520 of the host in a similar way, such that the device may read from and/or write to the memory block 540 in the device memory 530 as if the device were actually reading from or writing to the memory block 520 in the host memory 510.

Turning to the memory block 520, this reserved memory block may include two portions. A first portion may include a buffer 522 of a certain size, such as a 1 MB buffer, starting at host memory address 0xYY and ending at host memory address 0xYY+0x100000. The buffer 522 may be used to store a firmware update as part of updating a firmware of the device. A second portion of the memory block 520 may include a control register 524 of a certain size, such as 40 bytes, starting at host memory address 0xYY+0x100001 and ending at host memory address 0xYY+0x100028. The control register 524 may be used to store information about the firmware update to allow control of the update by, for example, the host. The memory block 540 of the device may include similar portions. For example, a buffer 542 of the memory block 540 may correspond to the buffer 522 of the memory block 520. Likewise, a control register 544 of the memory block 540 may correspond to the control register 524 of the memory block 520.

As such, based on the BAR and the ATU, changes made to the buffer 522 (e.g., addition of a firmware update) and/or the control register (e.g., addition of firmware update information) may be accessible to the device from the buffer 542 and the control register 544, respectively. Conversely, changes made to the buffer 542 and/or the control register 544 (e.g. the device adding the device's status in the control register 544) may be accessible to the host from buffer 522 and the control register 524, respectively. For ease of references, the buffers 522 and 542 may be referred to as a live update buffer(s) and the control registers 524 and 544 may be referred to as a live update control(s).

Figure 6:
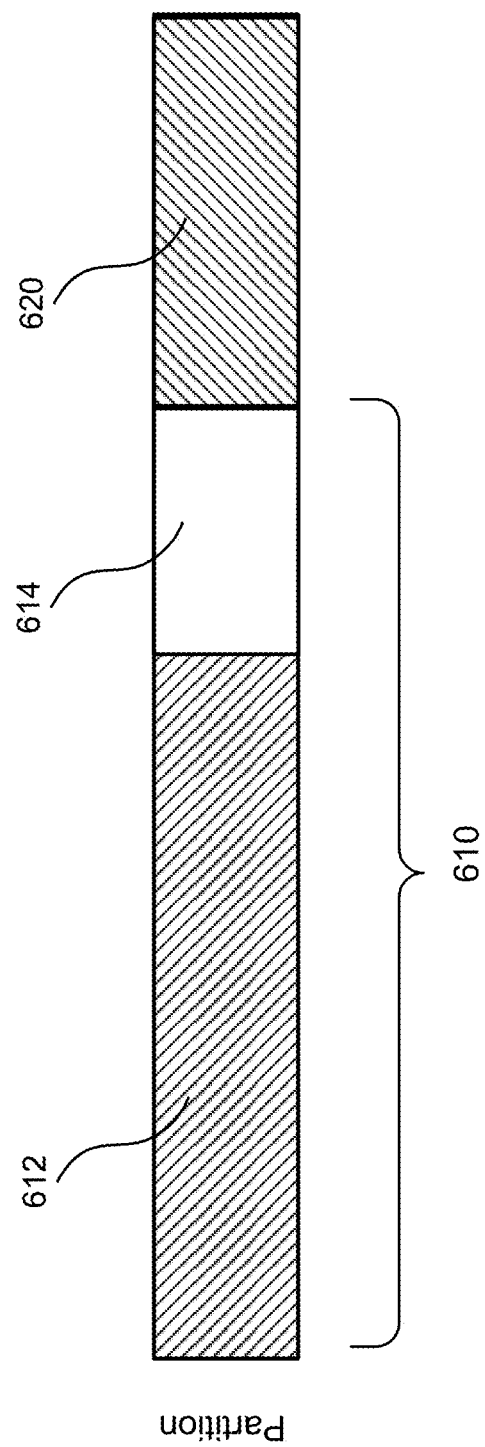
FIG. 6 illustrates an example software partition, according to embodiments of the present disclosure.

For a seamless update, the firmware may be partitioned into updatable and non-updatable portions. The updatable portions may be updated, whereas the non-updatable portions may not be updated as part of updating the firmware. FIG. 6 illustrates an example of the partition of a device's running firmware.

As illustrated, the firmware may be portioned into an updatable portion 610 and a non-updatable portion 620. In turn, the updatable portion 610 may include the embedded code 612 and updatable data 614 (e.g., different variable values generated from the execution of the embedded code 612, and/or different configurations of the variables of the embedded code 612). In comparison, the non-updatable portion 620 may include data that may not be updated until after the firmware is updated to the new version. In an example, the non-updatable portion 620 may include the running state of the firmware. In this way, the non-updatable portion 620, including the running state of the firmware, may be reserved and may not be updated as part of the firmware instead. Instead, upon completion of the firmware update, the device may perform a context switch to use the reserved state and other non-updatable data, which may result in a seamless update of the running firmware. Once the firmware updating is complete, the non-updatable portion 620 may be updatable again based on the execution of the new firmware.

In another example, the non-updatable portion 620 may include a snapshot of datasets from the current running version. For instance, the device may generate the snapshot prior to or just in time before starting the update. Once the update to the next version is complete, the datasets may be transformed for use in running the next version. As further illustrated in FIG. 7, that transformation may be performed by the next version (e.g., by a set-up routine of the next version). To illustrate, consider the example of the current running version of the firmware (or, more generally, any type of code) using records for storing information about users. Each of the records may use an original number of entries (e.g., two entries per record). In comparison, the new version of the firmware (or, more generally, the code), may use a different number of entries per record (e.g., four entries). As such, the non-updatable portion 620 may include a snapshot of the records having the original number of entries. Upon completion of the update, the set-up routine of the next version may update the records to use the different number of entries without altering the existing datasets in the records captured in the snapshot.

In addition, the firmware may generally be interrupt-driven, where an interrupt may cause the device to use the firmware and provide the corresponding functionality. As such, when the firmware update is being copied, the running firmware may nonetheless be used in response to interrupts.

Figure 7:
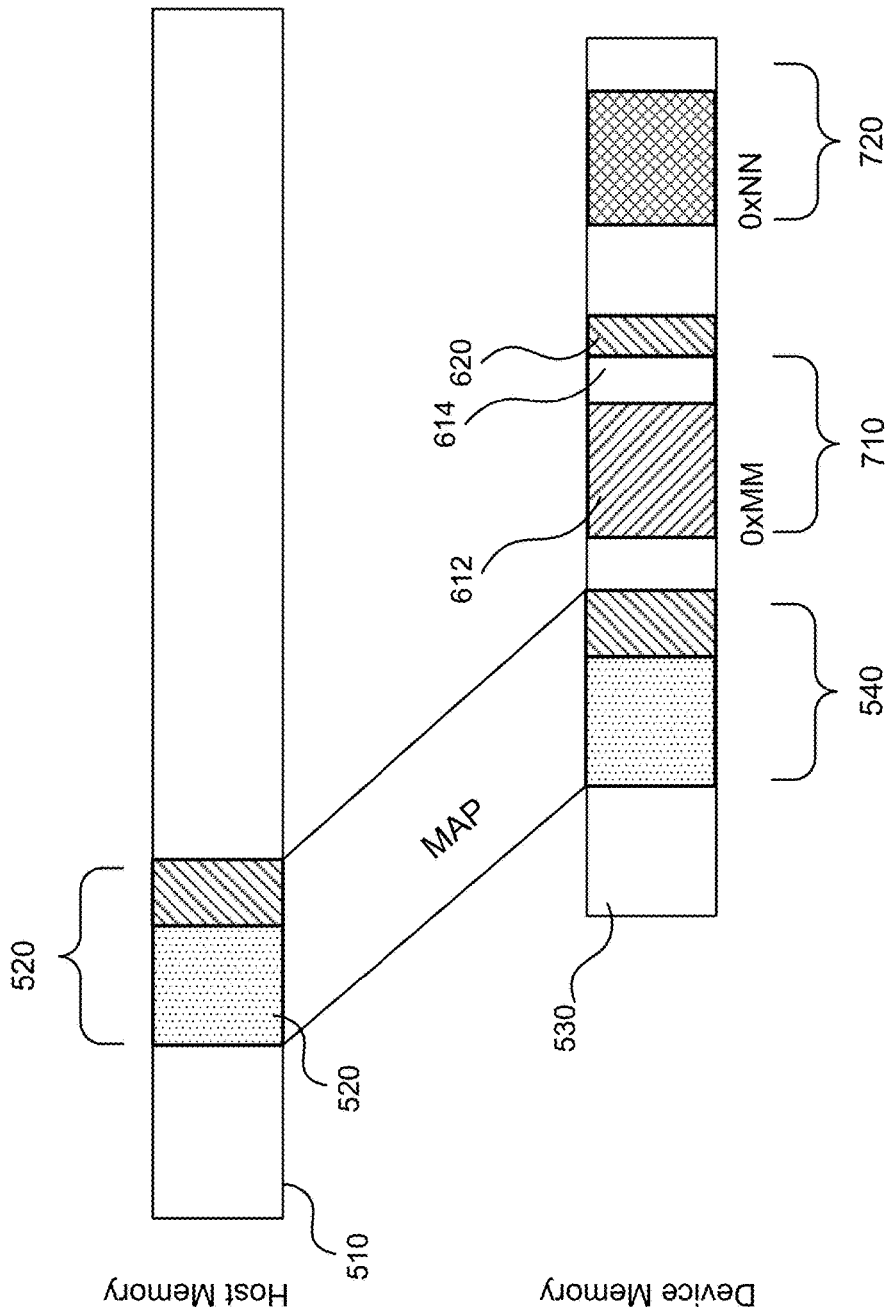
FIG. 7 illustrates an example of a firmware running state, according to embodiments of the present disclosure.

Turning to FIG. 7, the figure illustrates the various memory blocks of the host memory 510 and the device memory 530 that may be used to update the partitioned firmware (as illustrated in FIG. 6). In particular, the reserved memory blocks 520 and 540 may be used. In addition, a third memory block 710 and a fourth memory block 720 of the device memory 530 may be used. These different memory blocks may be of a same or similar sizes (e.g., the third and fourth memory blocks 710 and 720 may not be larger than the reserved memory block 540). The third memory block 710 and the fourth memory block 720 may start at device memory address 0xMM and 0xNN, respectively. These addresses may be saved in respective BAR registers in the device's configuration space register.

The third memory block 710 may be used for the current running version of the firmware (e.g., version "N"). For example, the third memory block 710 may include a buffer.

That buffer may store the embedded code 612 of the firmware and some or all of the updatable data 614. The non-updatable data 620 may be stored in a location adjacent to, or within a predefined location of, the third memory block 710. Such a location may also be saved in a BAR register in the device's configuration space register.

In comparison, the fourth memory block 720 may be used for the firmware update (e.g., the next version "N+1" of the firmware). For example, the fourth memory block 720 may include a buffer for storing the firmware update and any of the updatable data. The buffer may be empty or may contain a previous, non-running version of the firmware (e.g., the previous version "N−1"). When the firmware is copied to the buffer of the fourth memory block 720 as part of the updating, the non-updatable data 620 may be used from its existing memory location and need not be copied to a new location. As herein explained above, the next version "N+1" may include a set-up routine for transforming the non-updatable data 620, as needed, for use by the next version "N+1." This transformation may include, for instance, changing a format of datasets of the non-updatable data 620 without altering the actual data in the non-updatable data 620. The format may depend on the next version "N+1" such that, upon transformation, the non-updatable data 620 may be usable by the next version "N+1." In certain situations, efficiencies may be gained by locating the non-updatable data 620 in between the third and fourth memory blocks 710 and 720, such that the location of this data may adjoin both memory blocks. These efficiencies may include an increase to the speed of I/O reads from using adjoining memory blocks.

Although FIG. 7 illustrates the use of two additional memory blocks, a larger or smaller number of additional memory blocks may similarly be used. In an example, if only one memory block is used (e.g., the third memory block 710 but no other additional memory blocks), dynamic mapping may be applied such that updating the firmware may use the reserved memory block 540 and the third memory block 710. In particular, the firmware update (e.g., version "N+1") may be available from the buffer 542 of the reserved memory block 540. As such, no additional copying may be needed. Instead, the firmware update may be used (e.g., run) from that buffer 542. However, the map 550 may be updated such that the reserved memory block 520 of the host and the third memory block 710 may be mapped to each other after the completion of the update. This dynamic mapping may reverse the roles of the reserved memory block 540 and the third memory block 710. Accordingly and for the next version of the firmware (e.g., version "N+2"), the third memory block 710 may be used as a reserved memory block, whereas the reserved memory block 540 may be storing the latest running version (e.g., version "N+1"). The dynamic mapping may include updating the BAR registers and/or address translations in the device's configuration space and ATU.

In an illustrative example of dynamic mapping, a small memory block of a few bytes may be reserved in the host memory 510. This memory block, referred to as a control block for ease of reference, may be mapped to control registers of the ATU of the device. The starting address of the control block may be saved in another BAR register of the device's configuration space register. Because the BARs may be fixed in the device configuration space register, the third memory block 710 may normally not be accessible by the host using the memory block 520 in host memory 510. In order to access the third memory block 710 in the device memory 540 using the memory block 520 in the host memory 510, the host may write an appropriate value, such as, for example, an offset of 0xZZ+0x1000000-0xMM, to the control block in the host memory 510, which may effectively write to the control registers in the device memory 540, such that address 0xYY in the host memory space may be translated to address 0xMM in the device memory space by the ATU. In this way, the host may read to and/or write from the memory block 520 as if it were actually reading to and/or writing from the third memory block 710 in the device memory 540.

Figure 8:
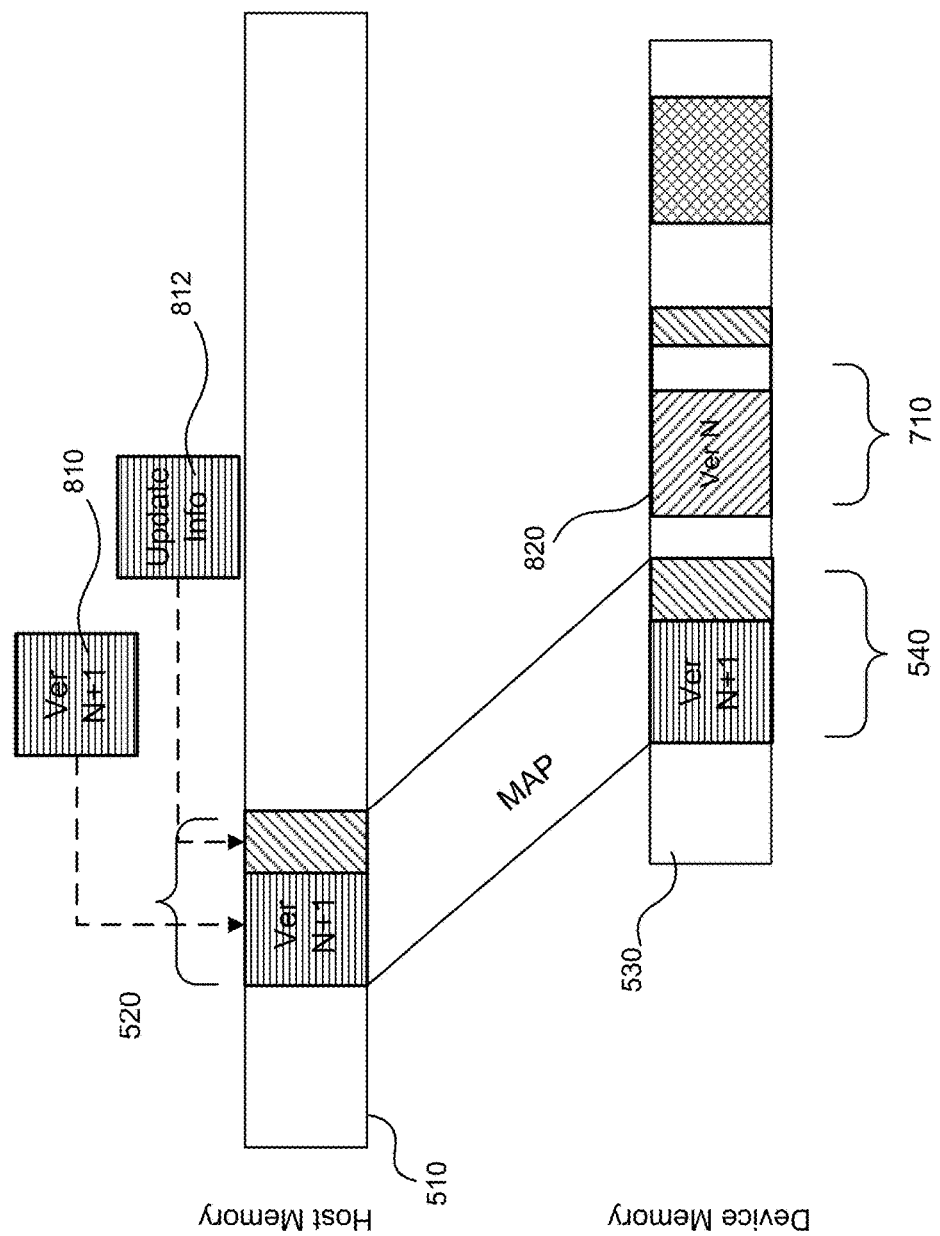
FIG. 8 illustrates an example of a host setting a new firmware version, according to embodiments of the present disclosure.

The different memory blocks as illustrated in FIG. 7 may be used to update the firmware. FIG. 8 illustrates how some of these memory blocks may be used to pass the firmware update to the device as part of the update. In particular, FIG. 8 illustrates the device running a current version of the firmware (shown as version "N" 820 in the figure). The version "N" 820 may be stored in the third memory block 710. By using an update tool of the host, such as the update tool 112 of FIG. 1, a firmware update (shown as version "N+1" 810 in the figure) may become available. The update tool may copy the version "N+1" 810 to the host reserved memory block 520. In an example, the version "N+1" 810 may copied to the live update buffer 522. In addition, the update tool may generate and add update information 812 to the host reserved memory block 520. In an example, the version update information 812 may copied to the live update control 524. The update information 812 may represent different host variables and/or may be associated with the update of the firmware. For example, the update information 812 may include information about version "N+1" 810 (e.g., a size and a checksum of the version "N+1" 810), about the needed buffer (e.g., the size and/or identifier of the fourth memory block 720), and about the upgrade (e.g., a Boolean value indicating that the upgrade should be performed, and a secret shared between the host and the device for added security). This update information 812 may be used as part of a handshake between the host and the device to initiate the update of the firmware.

In addition, the tool may generate a ping such that the host may signal the device that an update to the firmware is available. The ping may trigger the device to complete the update. Various techniques may be used for the ping. In one example technique, the configuration space of the device may be used. In particular, when the live update control 524 is edited (e.g., any of or a specific portion of the update information 812 is added to the live update control 524), the edit may trigger a read and/or write transaction to the configuration space of the device. In turn, an interrupt handler may occur on the device triggering the device to access the live update control 544 on the device memory 540. For added performance, the read and/or write transaction may need to be to a predefined location of the configuration space, such as to the last byte thereof (e.g., a read from "0xFFC" address). This usage of the configuration space to generate the ping may be set up as part of the handshake process between the host and the device (e.g., the initial discovery, configuration, and/or enumeration process). In another example technique, the host may cause an interrupt handler such that the device may read a byte from a predefined location of the live update control 544 (e.g., the location storing the Boolean value indicative of the upgrade). In yet another example technique, the device may repeatedly check the live update control 544 at a predefined time interval.

Figure 9:
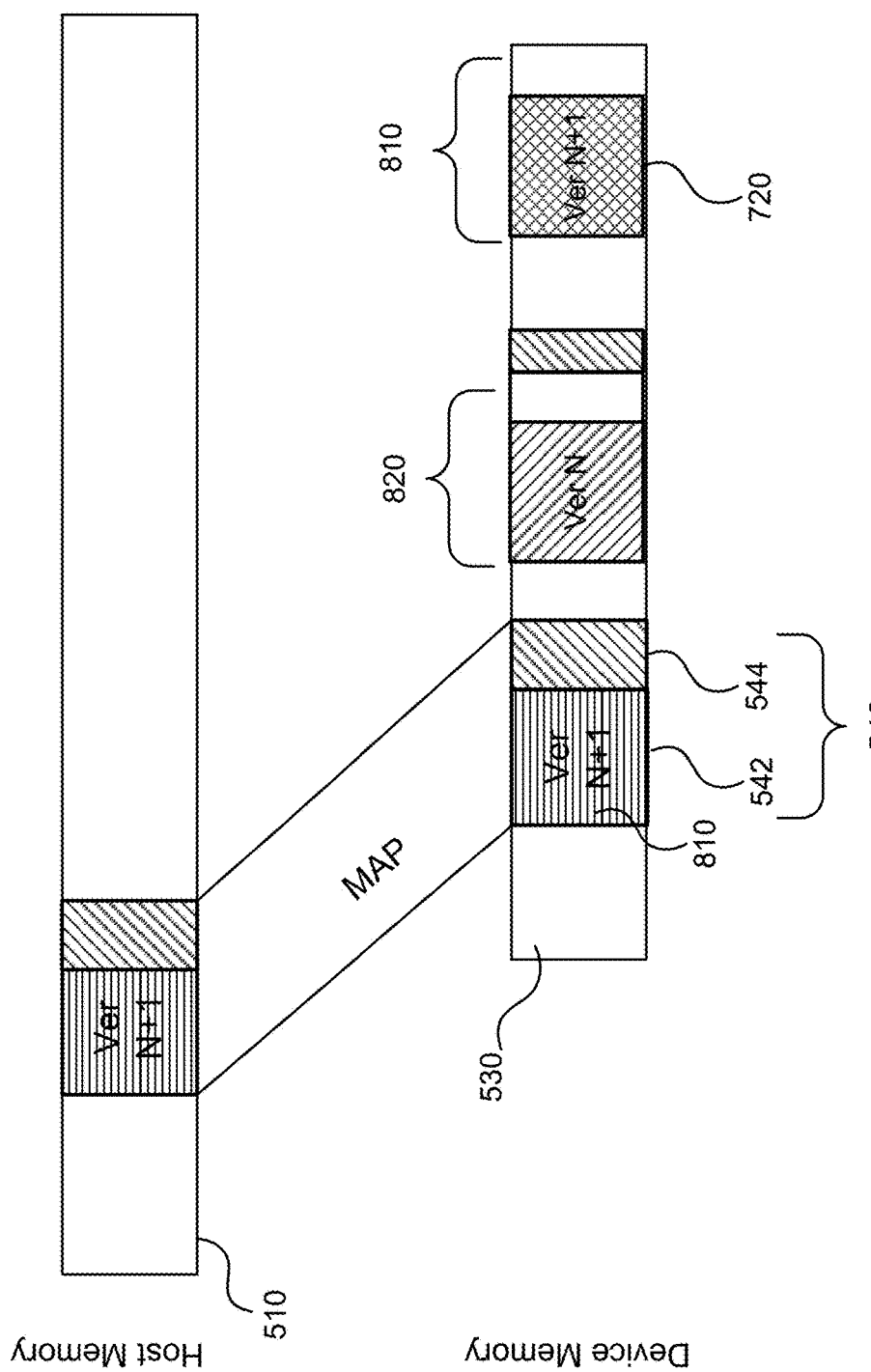
FIG. 9 illustrates an example of a device switching to a new firmware version, according to embodiments of the present disclosure.

Once the ping is received, the device may complete the update as shown in the illustrative example of FIG. 9. In particular, completing the update may include copying the version "N+1" 810 to the fourth memory block 720 and switching from the version "N" 820 to the version "N+1" 810. The copying may not be needed if dynamic mapping is used as described in FIG. 8. In an example, version "N" 820 of the running code may perform the copying while version "N+1" 810 of the running code may perform the switching. In another example, the device may use other code stored in the device memory 810 to perform the copying and/or the switching. In yet another example, the host may perform the copying and/or switching by using blocks of the host memory that are mapped to the device memory.

The copying may involve multiple steps. In an example step, the device may access the live update control 544 and, based on the update information 812, determine that the version "N+1" 810 is available. For example, the device may check the Boolean value to determine that the update should be performed, the checksum to determine that no errors occurred, and the secret for security. In another example step, if the check is successful, the device may signal the host that the device may be entering an updating state (or that the update is not proper if the check fails). For instance, the device may add device variables to the live update control 544. These device variables may include an identifier of the version "N" 820, the buffer from the third memory block 710 storing the version "N" 820, and/or a device status (e.g., "updating state"). Once the device completes the update (by copying and switching to the version "N+1" 810), the device may similarly update its status. The host may at predefined time intervals check the live update control 524 of the host memory 510 to determine the status of the device.

In yet another example step, the device may copy version "N+1" 810 from the live update buffer 542 in the reserved memory block 540 on the device memory 530 to the buffer in the fourth memory block 720 on the device memory 530. The device may not copy non-updatable data to the fourth memory block 720. For the update to appear seamless to the host and/or other interfacing computing resources (e.g., not requiring a shutdown, restart, or reset of the device, the host, and/or the other interfacing computing resources), the copying may be performed in chunks such that pending interrupts from the host and/or other interfacing computing resources may be served between copying the chunks. For instance, after copying a chunk, the device may check if an interrupt is pending and may respond to such an interrupt before copying the next chunk. As such, while the device may be copying version "N+1" 810, the device may still serve the host and/or the other interfacing computing resources.

The size of the chunk may impact how seamless the updating may appear. The smaller the size, the more seamless the updating may be. The size may also impact the duration needed to complete the update or the speed of the update. As such, the size may be set as a balance between performance (e.g. seamlessness) and update speed. This balance may depend on the functionality of the device and an expected frequency of the host and/or the interfacing devices using the functionality. For example, if the device is a network interface card, the expected frequency may be large based on data traffic through the network interface card. As such, the size of the chunks may be made relatively small. On the other hand, if the device is a storage device, the size of the chunks may be made relatively larger.

Once the copying is complete (if copying is performed), the device may switch to using the version "N+1" 810 instead of version "N" 820. In an example, the execution of version "N" 820 may move to a predefined location of the buffer in the fourth memory block 720 on the device memory 530 (e.g. to the start of the buffer at the "0xNN" address). For instance, the predefined location may be set in a control register of the device such that the device's processor may determine and access the predefined location. The predefined location may store a set-up routine, which may be a part of the version "N+1" 810. The set-up routine may re-initialize any hardware settings, register any interrupts, and transform any of the non-updatable data 620 (which may not have been copied). In addition, the set-up routine may use any of the copied updatable data 612 and/or reset such data or other data corresponding to non-copied updatable data 612 to default values. As such, the device may continue using the firmware given the last running state of the firmware, except that now version "N+1" 810 is running.

Once switching between firmware versions occurs, the update of the firmware may be complete. The fourth memory block 720 (or the reserved memory block 542 if dynamic mapping was used) of the device may store the current running version of the firmware. In comparison, the third memory block 710 may store the previous version of the firmware, which is no longer being executed. The third memory block 710 may be re-used in the next update cycle (e.g., to store version "N+2") or may be freed for other transactions.

Figure 10:
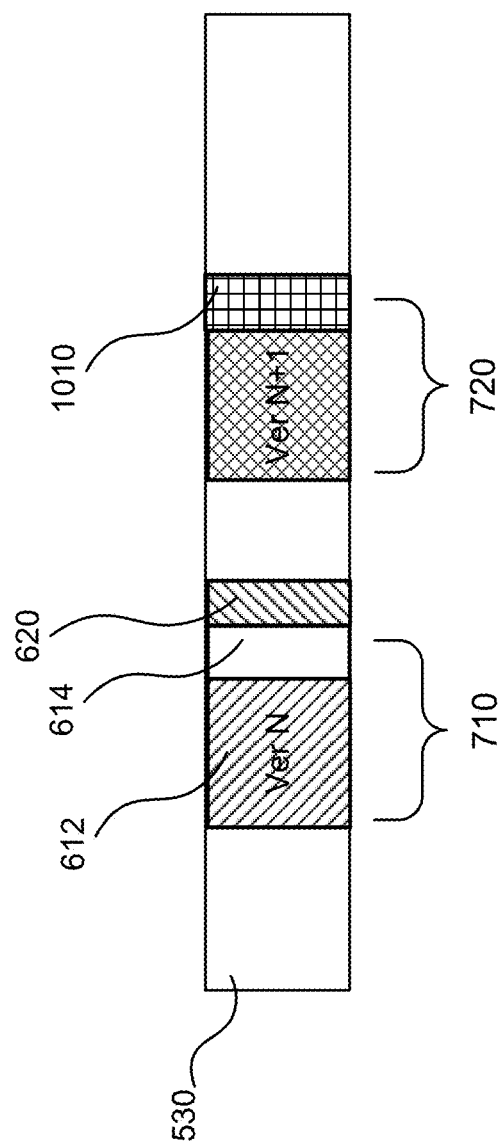
FIG. 10 illustrates an example of a complete firmware switch, according to embodiments of the present disclosure.

FIG. 10 illustrates the various memory blocks of the device memory 530 upon the completion of the update. In particular, the older version "N" 820 of the firmware may reside in the third memory block 710 and may include the older version of the embedded code 612 and the updatable data 614. In comparison, the non-updatable data 620 may remain at the same memory location. Once the update is completed, updating this data 620 may resume at that memory location (e.g., the current running state data may replace the older running state 620). The current version "N+1" 810 resides in the fourth memory block 720. Current updatable data 1010 may also reside in the device memory 530.

Figure 11:
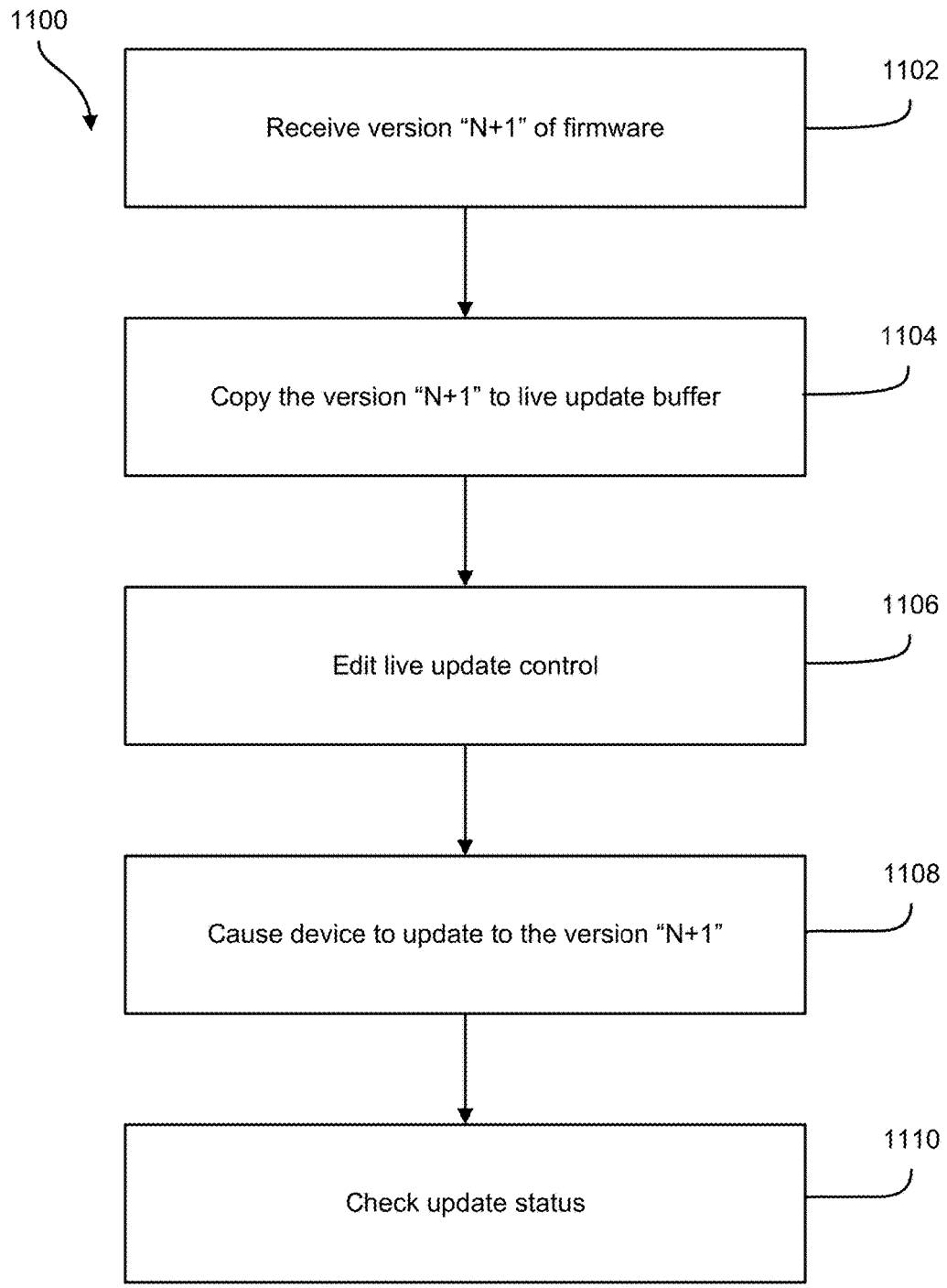
FIG. 11 illustrates an example flow for a host setting a new firmware version, according to embodiments of the present disclosure.

FIG. 11 illustrates an example flow 1100 that the host may use to trigger the update of the device's firmware. The example flow 1100 may use the various memory blocks and techniques as described in FIGS. 5-10. In the illustrative operations, some of the operations or functions may be embodied in, and fully or partially automated by, modules executed by one or more processors of the host, such as by the update tool. In addition, while the operations are illustrated in a particular order, it should be understood that no particular order is necessary and that one or more operations may be omitted, skipped, and/or reordered.

The example flow 1100 may start at operation 1102, where the host may receive a version "N+1" of the firmware (e.g., the firmware update, where version "N" may be the current running version of the firmware). At operation 1104, the host may copy the version "N+1" to a live update buffer of the host memory. The live update buffer may be mapped to a live update buffer of the device memory.

At operation 1106, the host may edit a live update control of the host memory. The host may, for example, input host variable in the live update control, such as information about a size and a checksum of the version "N+1", the needed buffer, the upgrade (e.g., a Boolean value indicating that the upgrade should be performed), and a secret shared between the host and the device. The live update control may also be mapped to a live update control of the device memory.

At operation 1108, the host may cause the device to update to the version "N+1" from the version "N" of the firmware. For example, the host may signal the device that an update to the firmware is available. In response, the device may access the live update control of the device memory to initiate the update on the device. Accordingly, the device may access the live update buffer of the device memory to receive the version "N+1" of the firmware and perform any applicable copying and/or switching to the version "N+1."

At operation 1110, the host may check a status of the update. For example, a time intervals the host may poll live update control to determine any edits provided by the device. These edits may include a status of the device (e.g., whether the device may be updating the firmware, whether the update may have been rejected, or whether the update may have been completed).

Figure 12:
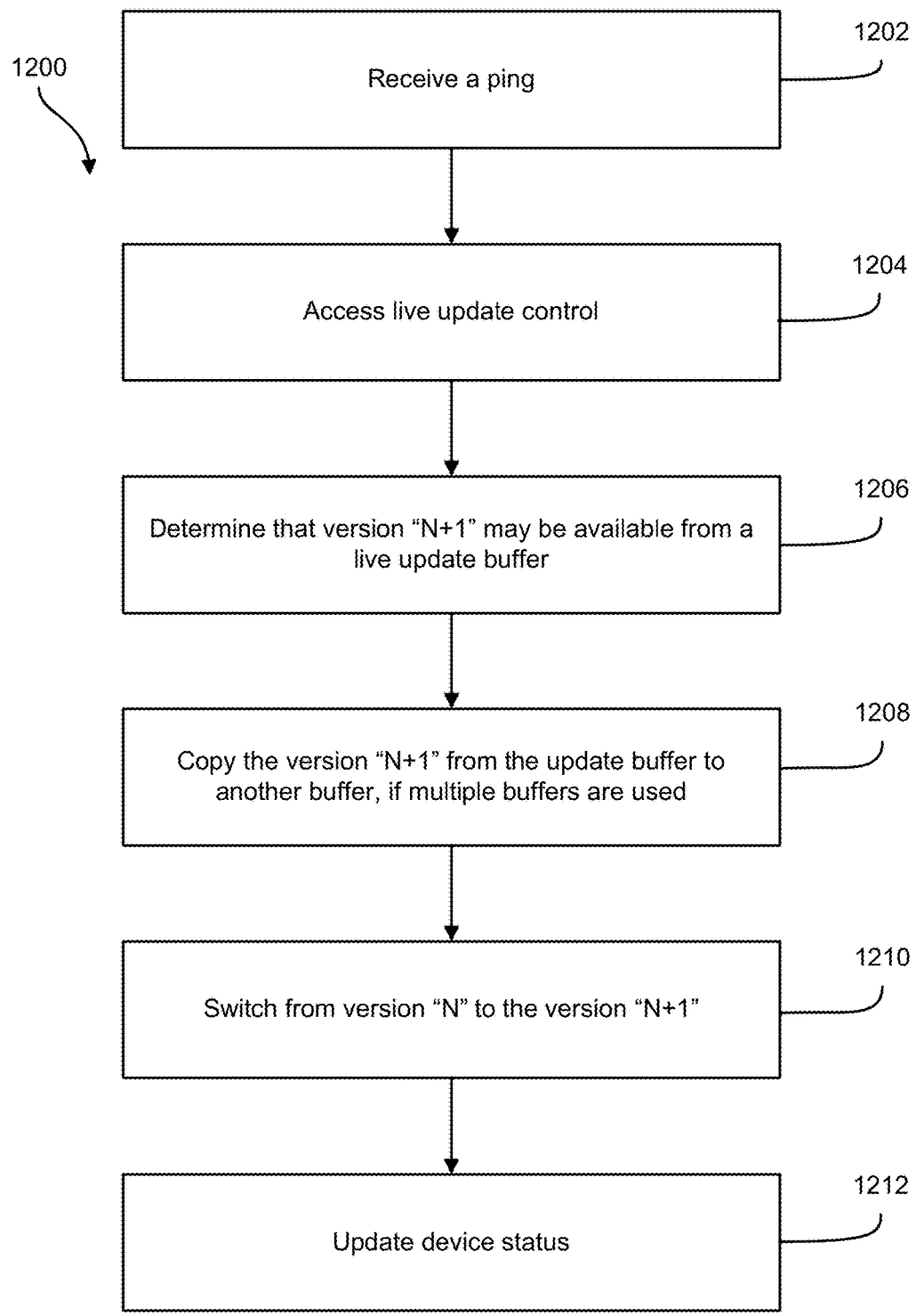
FIG. 12 illustrates an example flow for a device switching to a new firmware version, according to embodiments of the present disclosure.

FIG. 12 illustrates an example flow 1200 that the device may use to complete the update of the firmware once such update is triggered by the host. The example flow 1200 may use variations of the various memory blocks and techniques as described in FIGS. 5-10. In the illustrative operations, some of the operations or functions may be embodied in, and fully or partially automated by, modules executed by one or more processors of the device. In an example, the device may use the current running version of the firmware (e.g., the version "N" to perform some or all of these operations). In addition, while the operations are illustrated in a particular order, it should be understood that no particular order is necessary and that one or more operations may be omitted, skipped, and/or reordered.

The example flow 1200 may start at operation 1202 where the device may receive a ping from the host. The ping may trigger the device to start updating the firmware. In an example, the ping may represent a particular transaction, such as a read or write transaction to a predefined location of the device's configuration space.

At operation 1204, the device may access a live update control of the device memory. The live update control may be mapped to a live update control of the host memory. As such, the accessed live update control may include information about the firmware update, such as information about a size and a checksum of the version "N+1", the needed buffer, the upgrade (e.g., a Boolean value indicating that the upgrade should be performed), and a secret shared between the host and the device.

At operation 1206, the device may determine that the version "N+1" may be available from a live update buffer of the device memory. For example, the device may check the update information and accordingly determine that the update to the version "N+1" should be performed. The live update buffer of the device memory may be mapped to a live update buffer of the host memory. As such, the version "N+1" may be available from the same physical memory space. Because of the mapping between the host memory and device memory, the version "N+1" is also available from live update buffer of the memory.

At operation 1208, the device may copy the version "N+1" from the live update buffer of the device memory to another buffer of the device memory, such as one located in a predefined memory block of the device memory. The version "N+1" may be copied in chunks such that the update may be seamlessly performed relative to the host and/or other interfacing computing resources. Any non-updatable data, such as state data, of the current version "N" of the firmware may not be copied or, if copied, may not be changed to reserve the state data for instance.

At operation 1210, the device may switch from the current version "N" to the next version "N+1." For example, a set-up routine from a predefined location of the buffer where version "N+1" may have been copied may be used. The set-up routine may, as needed, re-initialize hardware settings, register interrupts, default updatable data, and transform non-updatable data. The non-updatable data may be used for a context switch such that, for example, the last running state of the version "N" may be used as the initial running state of the version "N+1."

At operation 1212, the device may update the device status. This may allow the host to determine the status of the update. For example, the device may add to the live update control of the device memory a status of whether the device is updating the firmware, whether the update was rejected, or whether the update was completed.

Although FIG. 12 illustrates an example flow where the device updates the firmware, some or all of the operations of the example flow may alternatively be performed by the host. For example, the host may copy the update to the firmware (e.g., the next version "N+1") from the reserved block of the host memory to a buffer of the host memory. That buffer may also be mapped to a buffer of the device memory in the device configuration space. Once the copying is complete, the host may signal to the device that the update to the firmware is available. Accordingly, the device may access the buffer of the device memory to run the update to the firmware. This access may include, for instance, running a sub-routine from the update to switch the execution of the firmware from the previous version "N" to the next version "N+1."

Figure 13:
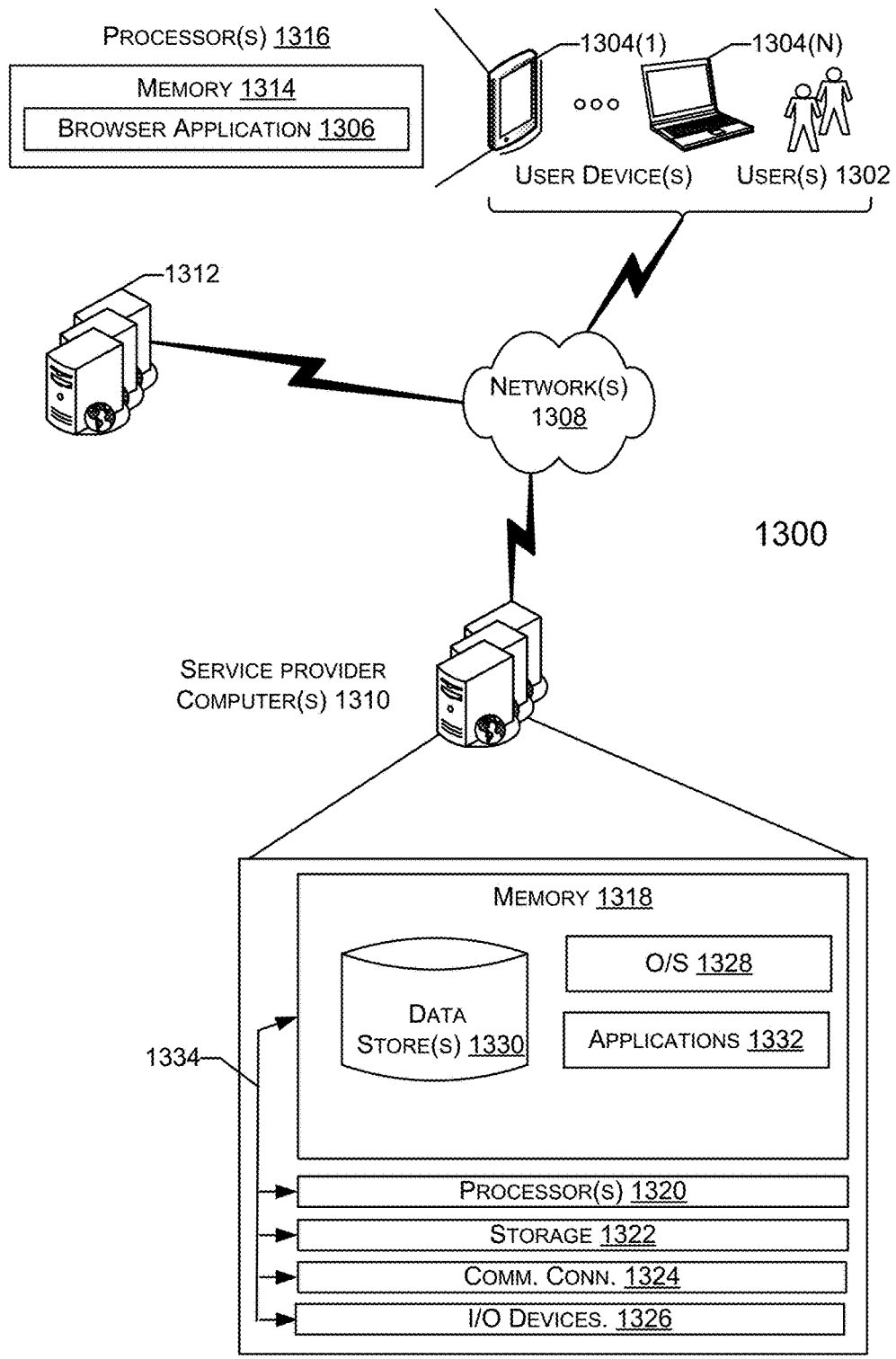
FIG. 13 illustrates an example architecture for features and systems described herein that includes one or more service provider computers and/or a user device connected via one or more networks, according to embodiments of the present disclosure.

FIG. 13 illustrates an example architecture for features and systems described herein that includes one or more service provider computers and/or a user device connected via one or more networks. The devices discussed in FIGS. 1-12 may use one or more components of the computing devices described in FIG. 13 or may represent one or more computing devices described in FIG. 13. In the illustrated architecture 1300, one or more users 1302 may use user computing devices 1304(1)-(N) to access an application 1306 (e.g., a web browser or mobile device application), via one or more networks 1308. In some aspects, the application 1306 may be hosted, managed, and/or provided by a computing resources service or service provider. One or more service provider computers 1310 may provide a native application that is configured to run on the user devices 1304, which the user(s) 1302 may interact with. The service provider computer(s) 1310 may, in some examples, provide computing resources such as, but not limited to, client entities, low latency data storage, durable data storage, data access, management, virtualization, cloud-based software solutions, electronic content performance management, and so on. The service provider computer(s) 1310 may also be operable to provide web hosting, computer application development and/or implementation platforms, combinations of the foregoing or the like to the user(s) 1302. The service provider computer(s) 1310, in some examples, may communicate with one or more third party computers 1312.

In some examples, the network(s) 1308 may include any one or a combination of many different types of networks, such as cable networks, the Internet, wireless networks, cellular networks and other private and/or public networks. While the illustrated example represents the user(s) 1302 accessing an application 1306 over the network(s) 1308, the described techniques may equally apply in instances where the user(s) 1302 interact with the service provider computer(s) 1310 via the user device(s) 1304 over a landline phone, via a kiosk or in some other manner. The described techniques may also apply in other client/server arrangements (e.g., set-top boxes, etc.), as well as in non-client/ server arrangements (e.g., locally stored applications, etc.).

As described briefly above, the application 1306 may allow the user(s) 1302 to interact with the service provider computer(s) 1310 to, for example, access web content (e.g., web pages, music, video, etc.). The service provider computer(s) 1310, which may be arranged in a cluster of servers or as a server farm, may host the application 1306 and/or cloud-based software services. Other server architectures may also be used to host the application 1306. The application 1306 may be capable of handling requests from many users 1302 and serving, in response, various item web pages. The application 1306 can provide any type of website that supports user interaction, including social networking sites, online retailers, informational sites, blog sites, search engine sites, news and entertainment sites, and so forth. As discussed above, the described techniques can similarly be implemented outside of application 1306, such as with other applications running on the user device(s) 1304.

The user device(s) 1304 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 1304 may be in communication with the service provider computer(s) 1310 via the network(s) 1308, or via other network connections. Additionally, the user device(s) 1304 may be part of the distributed system managed by, controlled by, or otherwise part of the service provider computer(s) 1310 (e.g., a console device integrated with the service provider computers 1310).

In one illustrative configuration, a user device(s) 1304 may include at least one memory 1314 and one or more processing units (or processor(s) 1316). The processor(s) 1316 may be implemented in hardware, computer-executable instructions, firmware, or combinations thereof. Computer-executable instruction or firmware implementations of the processor(s) 1316 may include computer-executable or machine-executable instructions written in any suitable programming language to perform the various functions described. The user device(s) 1304 may also include geo-location devices (e.g., a global positioning system (GPS) device or the like) for providing and/or recording geographic location information associated with the user device(s) 1304.

The memory 1314 may store program instructions that are loadable and executable on the processor(s) 1316, as well as data generated during the execution of these programs. Depending on the configuration and type of the user device(s) 1304, the memory 1314 may be volatile (such as random access memory (RAM)) and/or non-volatile (such as read-only memory (ROM), flash memory, etc.). The user device(s) 1304 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, the memory 1314 may include multiple different types of memory, such as static random access memory (SRAM), dynamic random access memory (DRAM), or ROM.

Turning to the contents of the memory 1314 in more detail, the memory 1314 may include an operating system and one or more application programs or services for implementing the features disclosed herein including at least a user provided input element or electronic service web page, such as via a browser application 1306 or dedicated applications (e.g., smart phone applications, tablet applications, etc.). The browser application 1306 may be configured to receive, store and/or display a website or other interface for interacting with the service provider computer(s) 1310. Additionally, the memory 1314 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 1304.

In some aspects, the service provider computer(s) 1310 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1310 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 1310 may be in communication with the user device(s) 1304 and/or other service providers via network(s) 1308, or via other network connections. The service provider computer(s) 1310 may include one or more servers, perhaps arranged in a cluster, as a server farm, or as individual servers not associated with one another. These servers may be configured as part of an integrated, distributed computing environment.

In one illustrative configuration, the service provider computer(s) 1310 may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the service provider computer(s) 1310, the memory 1318 may be volatile (such as RAM) and/or non-volatile (such as ROM, flash memory, etc.). The service provider computer(s) 1310 or servers may also include additional storage 1322, which may include removable storage and/or non-removable storage. The additional storage 1322 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1318 and the additional storage 1322 are all examples of computer storage media. Additional types of computer storage media that may be present in service the provider computer(s) 1310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1310. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 1310 may also contain communications connection(s) 1324 that allow the service provider computer(s) 1310 to communicate with a stored database, another computing device or server, user terminals and/or other devices on the network(s) 1308. The service provider computer(s) 1310 may also include I/O device(s) 1326, such as a keyboard, a mouse, a pen, a voice input device, a touch input device, a display, speakers, a printer, and the like. The communication connection(s) 1324 and the I/O device(s) 1326, along with the storage 1322, may be described as peripheral devices.

The memory 1318 may include an operating system 1328, one or more data stores 1330 and/or one or more application programs 1332 or services for implementing the features disclosed herein.

The service provider computer(s) 1310 may also include one or more communication channels 1334. A communication channel 1334 may provide a medium over which the various components of the service provider computer 1310 can communicate. Communication channel or channels 1334 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules.

Figure 14:
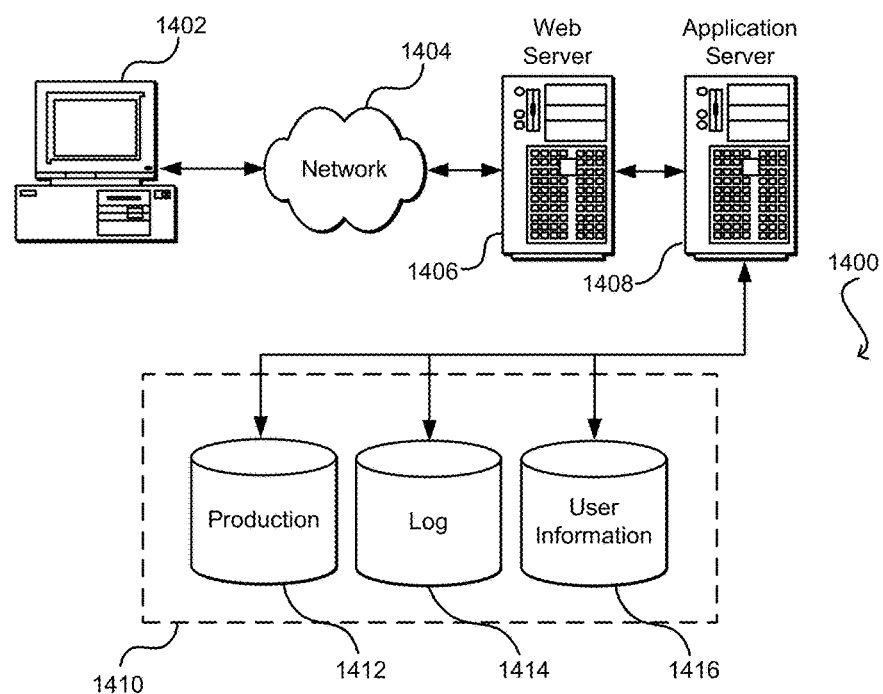
FIG. 14 illustrates an environment in which various embodiments of the present disclosure can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side.

The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for providing firmware updates to computer components, the system comprising:
    a host with a host memory storing computer-readable instructions;
    a device with a device memory storing other computer-readable instructions, the device configured to run a current version of firmware from a first buffer of the device memory; and
    a bus that connects the host and the device,
    wherein the host, based on executing the computer-readable instructions, performs steps of:
    copying an updated version of the firmware to a reserved block of the host memory, the reserved block of the host memory having a host memory address,
    adding update information about the updated version of the firmware to the reserved block of the host memory, and
    signaling, over the bus, the device that the updated version of the firmware is available;
    wherein the device, based on executing the other computer-readable instructions, performs other steps of:
    accessing a reserved block of the device memory based on the signaling, the reserved block of the device memory having a device memory address, the device memory address mapped to the host memory address based on a map associated with the bus, the reserved block of the device memory storing the updated version of the firmware and the update information based on the map, the reserved block of the device memory accessed based on a translation between the host memory address and the device memory address according to the map,
    copying the updated version of the firmware to a second buffer of the device memory from the reserved block of the device memory, and
    without a restart of the host or the device:
    stopping running the current version of the firmware from the first buffer,
    starting running the updated version of the firmware from the second buffer by at least using a sub-routine of the updated version and using a running state of the current version from a current block of the device memory, and
    based on the running of the updated version of the firmware:
    updating the running state in the current block of the device memory,
    adding variable values to another block of the device memory, and
    signaling, over the bus, the host that the updated version of the firmware is running.

2. The system of claim 1, wherein the bus is a peripheral component interconnect express (PCIe) bus, wherein the current block storing the running state does not change between stopping running the current version of the firmware and starting running the updated version of the firmware.

3. The system of claim 1, wherein copying the updated version of the firmware to the second buffer comprises:
copying a first portion of the updated version of the firmware to the second buffer;
detecting an interrupt;
handling the interrupt; and
copying a second portion of the updated version of the firmware to the second buffer after the interrupt is handled, and
wherein a size of the first portion or the second portion of the updated version of the firmware is based on a balance between a functionality of the device and speed of update of the firmware.

4. The system of claim 1, wherein the reserved block of the host comprises a live update buffer configured to store the updated version of the firmware and a live update control configured to store the update information, and wherein signaling the device that the updated version of the firmware is available comprises:
sending, to the device over the bus, a read transaction or a write transaction associated with a predefined location of the device memory.

5. The system of claim 1, wherein the current version of the firmware causes the device to copy the updated version of the firmware to the second buffer, wherein the sub-routine is copied to a predefined location of the second buffer, and wherein starting the running of the updated version of the firmware comprises running the sub-routine from the predefined location to further initialize at least one of a hardware setting or register an interrupt.

6. A device, comprising:
a processing entity; and
a non-transitory computer-readable memory storing computer-readable instructions,
wherein the device, based on executing the computer-readable instructions with the processing entity, performs steps of:
communicating with a management entity over a bus;
executing a first version of code, the first version stored in a first memory block of the device;
receiving, over the bus, a request from the management entity to update the first version of the code to a second version of the code;
accessing, based on the request, a second memory block that stores the second version of the code, the second memory block mapped to a reserved memory block of the management entity based on a map associated with the bus, the second memory block accessed based on an address translation between the second memory block and the reserved memory block of the management entity, the address translation based on the map;
reading the second version of the code from the second memory block; and
without a restart of the management entity or the device:
stopping running the first version of the code from the first memory block,
starting running the second version of the code by at least using a sub-routine of the second version and using state data of the first version from a third memory block of the device, and
based on the running of the second version:
updating the state data in the third memory block,
adding variable values to a fourth memory block of the device, and
signaling, over the bus, the management entity that the second version of the firmware is running.

7. The device of claim 6, wherein the management entity or a network location comprises the second memory block.

8. The device of claim 6, wherein the memory of the device comprises the second memory block, wherein the first version of the code comprises a subset of the instructions, wherein the subset when executed with the processing entity causes the device to determine that the second version is available from the second memory block.

9. The device of claim 6, wherein start running the second version of the code from the memory of the device comprises: copying the second version of the code from the second memory block to a fifth memory block of the device; and utilizing the second version from the fifth memory block to execute the code.

10. The device of claim 9, wherein executing the first version results in state data in the third memory block of the device, wherein the state data is not copied to complete the update to the second version of the code.

11. The device of claim 6, wherein starting running the second version of the code from the memory of the device comprises: executing the second version of the code from the second memory block: and allocating the first memory block to receiving a next version of the code.

12. The device of claim 6, wherein the instructions when executed with the processing entity further cause the device to: identify, to a computing resource based on the request, that the device is in an updating state and that the first version of the code is stored in the first memory block, wherein the updating state and the first version of the code are identified in the second memory block, and wherein the computing resource comprises the management entity, the device, or a resource that triggered the update; and identify, to the computing resource, a completion of the update of the first version of the code to the second version of the code, wherein the completion is identified in the second memory block.

13. The device of claim 6, wherein the instructions when executed with the processing entity further cause the device to: prior to stop running the first version of the code, copy a chunk of the second version from the second memory block to a fifth memory block of the device, switch to a higher and independent privilege mode in the processing entity prior to copying a next chunk of the second version, and copy the next chunk of the second version from the second memory block to the fifth memory block based on an interrupt being handled.

14. The device of claim 6, wherein the second memory block stores a checksum of the second version and a secret shared between the device and the management entity or a remote resource that triggered the update, wherein the instructions when executed with the processing entity further cause the device to determine that the second version of the code is available from the second memory block based on the checksum and the secret.

15. The device of claim 6, wherein the bus is a peripheral component interconnect express (PCIe) bus, wherein the first version of code comprises a first version of firmware, and wherein the second version of code comprises a second version of firmware.

16. The device of claim 6, wherein the device is a system-on-chip (SoC) or a field-programmable gate array (FPGA).

17. The device of claim 6, wherein stopping running the first version of the code and starting running the second version of the code comprises: generating a snapshot of first datasets from the first version of the code; and transforming, based on the sub-routine of the second version of the code, the snapshot of the first datasets to second datasets usable for running the second version of the code.

18. A management entity comprising:
a processor; and
a memory storing computer-readable instructions,
wherein the management entity, based on executing the computer-readable instructions with the processor, performs steps of:
communicating with a device over a bus, the device executing a current version of code;
adding update information to a block of memory to indicate that an updated version of the code is available from the block of the memory, the block of the memory mapped to a reserved memory block of the device based on a map associated with the bus; and
without a restart of the management entity or the device, causing the device to update the code from the current version of the code to the updated version of the code based on the updated version of the code being stored in the block of the memory, on the update information, and on an address translation between the block of the memory of the management entity and the reserved memory block of the device, the address translation based on the map, causing the device to update the code comprising causing the device to:
use a sub-routine from the updated version, the sub-routine configured to start running the updated version by at least using state data of the current version from a current block of memory of the device; and
based on running the updated version,
update the state data in the current block of the memory of the device, add variable values to another block of the memory of the device, and
signal, over the bus, the management entity that the updated version of the firmware is running.

19. The management entity of claim 18, wherein the updated version of the cord is stored in a first portion of the block of the memory, wherein the update information is added to a second portion of the block of the memory, and wherein causing the device to update the code comprises instructing the device to: access the first portion of the block of the memory to determine that the updated version is available from the second portion of the block of the memory, copy the updated version from the second portion to a memory of the device, and stop running the current version of the code and start running the updated version of the code from the memory of the device.

20. The management entity of claim 18, wherein causing the device to update the code comprises: sending, to the device, a transaction request or a network packet associated with updating the code to the updated version; and triggering the device to start the updating based on the transaction request or the network packet.

21. The management entity of claim 18, wherein the block of the memory storing the updated version is a block of memory of the management entity, wherein the block of the memory of the management entity is mapped to a block of the memory of the device, and wherein causing the device to update the code comprises: copying, by the management entity, the updated version to a buffer of the block of the memory of the management entity; indicating, to the device, that the updated version is available from the buffer.

22. The management entity of claim 18, wherein the computer-readable instructions when executed with the processor cause the management entity to provide a tool in a user space, wherein the tool is configured to store the updated version of the code in the block of the memory and to add the update information to the block of the memory.

23. The management entity of claim 18, wherein the updated version of the code is stored in a first portion of the block of the memory, wherein the update information is added to a second portion of the block of the memory, wherein the computer-readable instructions when executed with the processor further cause the management entity to determine, based on the second portion of the block of the memory, a state of the device associated with updating the code.

24. The management entity of claim 18, wherein causing the device to update the code comprises a handshake with the device.

25. The management entity of claim 18, wherein the block of the memory storing the updated version is accessible to at least one of the management entity or the device from a network location.

* * * * *